(12) United States Patent
Joynes et al.

(10) Patent No.: US 8,812,987 B2
(45) Date of Patent: Aug. 19, 2014

(54) VIRTUAL MULTIPLE SIDED VIRTUAL ROTATABLE USER INTERFACE ICON QUEUE

(71) Applicant: Wikipad, Inc., Los Angeles, CA (US)

(72) Inventors: Matthew R. Joynes, Agoura Hills, CA (US); James Bower, Windermere, FL (US); Daniel P. Dooley, Oklahoma City, OK (US)

(73) Assignee: Wikipad, Inc., Los Angeles, CA (US)

( * ) Notice: Subject to any disclaimer, the term of this patent is extended or adjusted under 35 U.S.C. 154(b) by 0 days.

(21) Appl. No.: 13/681,011

(22) Filed: Nov. 19, 2012

(65) Prior Publication Data

US 2013/0159928 A1 Jun. 20, 2013

Related U.S. Application Data

(63) Continuation-in-part of application No. 13/494,801, filed on Jun. 12, 2012.

(60) Provisional application No. 61/577,709, filed on Dec. 20, 2011.

(51) Int. Cl.
*G06F 3/048* (2013.01)
*G06F 1/16* (2006.01)
*A63F 13/00* (2014.01)

(52) U.S. Cl.
USPC ...... 715/836; 345/666; 361/679.11; 715/769; 715/846; 715/849

(58) Field of Classification Search
USPC .............. 345/666; 463/36–37; 715/702, 836, 715/849, 852
See application file for complete search history.

(56) References Cited

U.S. PATENT DOCUMENTS

| | | | |
|---|---|---|---|
| 5,967,898 A | 10/1999 | Takasaka et al. |
| 5,976,018 A | 11/1999 | Druckman |
| 6,290,565 B1 | 9/2001 | Galyean, III et al. |
| 6,710,764 B1 | 3/2004 | Burgel et al. |

(Continued)

OTHER PUBLICATIONS

Chartier; "Preorders begin for iPhone, iPod touch game controller." Published Feb. 8, 2011; in Macworld website (online); http://www.macworld.com/article/1157741/icontrolpad.html; entire document especially p. 1.

(Continued)

*Primary Examiner* — Dmitry Suhol
*Assistant Examiner* — Jason Yen
(74) *Attorney, Agent, or Firm* — Daniel P. Dooley; Hall Estill Attorneys at Law

(57) ABSTRACT

An apparatus generally directed to controlling a video game. The apparatus preferably includes a tablet computer, an electronic game communicating with the tablet computer, and an input device for controlling movement of a virtual object provided by the electronic game. Preferably, the input device includes a pair of opposing side structures adjacent opposing sides of a plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

20 Claims, 23 Drawing Sheets

(56) References Cited

U.S. PATENT DOCUMENTS

| | | | |
|---|---|---|---|
| 7,200,702 B2 | 4/2007 | Keely et al. | |
| 7,298,613 B2 | 11/2007 | Yin et al. | |
| 7,653,771 B2 | 1/2010 | Liberty | |
| 7,733,637 B1* | 6/2010 | Lam | 361/679.11 |
| 7,746,629 B2 | 6/2010 | Assouad et al. | |
| 7,758,424 B2 | 7/2010 | Riggs et al. | |
| 7,774,155 B2 | 8/2010 | Sato et al. | |
| 7,818,668 B2 | 10/2010 | Michelstein et al. | |
| 7,933,118 B2 | 4/2011 | Chiu et al. | |
| 7,942,745 B2 | 5/2011 | Ikeda et al. | |
| 8,018,098 B2 | 9/2011 | Lu et al. | |
| 8,100,769 B2 | 1/2012 | Rabin | |
| 8,100,770 B2 | 1/2012 | Yamazaki et al. | |
| 8,180,295 B2 | 5/2012 | Mao | |
| 8,188,977 B2 | 5/2012 | Kuwaki et al. | |
| 8,192,285 B2 | 6/2012 | Cheng et al. | |
| 2003/0147008 A1 | 8/2003 | Liu | |
| 2003/0231189 A1 | 12/2003 | Williams | |
| 2005/0255915 A1* | 11/2005 | Riggs et al. | 463/37 |
| 2005/0272471 A1 | 12/2005 | Sherman | |
| 2006/0224987 A1* | 10/2006 | Caffarelli | 715/767 |
| 2006/0291156 A1 | 12/2006 | Allen | |
| 2007/0268247 A1 | 11/2007 | Quatro | |
| 2009/0187862 A1* | 7/2009 | Dacosta | 715/836 |
| 2009/0209288 A1 | 8/2009 | Rofougaran | |
| 2009/0291760 A1 | 11/2009 | Hepburn et al. | |
| 2010/0081505 A1* | 4/2010 | Alten et al. | 463/36 |
| 2010/0115471 A1* | 5/2010 | Louch et al. | 715/849 |
| 2010/0279740 A1* | 11/2010 | Lee et al. | 455/566 |
| 2011/0118022 A1 | 5/2011 | Aronzon et al. | |
| 2011/0176395 A1* | 7/2011 | Mooring | 368/276 |
| 2011/0260969 A1 | 10/2011 | Workman | |
| 2011/0276911 A1* | 11/2011 | Choi | 715/769 |
| 2011/0296357 A1* | 12/2011 | Kim | 715/863 |
| 2012/0017147 A1* | 1/2012 | Mark | 715/702 |
| 2012/0108335 A1 | 5/2012 | Liotta et al. | |
| 2012/0169597 A1 | 7/2012 | Liotta | |
| 2013/0104079 A1* | 4/2013 | Yasui et al. | 715/834 |
| 2013/0106914 A1* | 5/2013 | Jain et al. | 345/666 |
| 2013/0326583 A1* | 12/2013 | Freihold et al. | 726/3 |

OTHER PUBLICATIONS

Wattanajantra; "iControlPad unofficial iPhone gamepad coming soon." In c/net UK website (online); Published Aug. 27, 2010; http://crave.cnet.co.uk/mobiles/icontrolpad-unofficial-iphone-gamepad-coming-soon-50000514; entire document, especially pp. 3, 4.

Atari Arcade; Website Printout; http://atari.com/buy-games/arcade/atari-arcade-ipad; Nov. 30, 2011; pp. 1-3.

Ion iCade Arcade Cabinet; Website Printout; http://www.ionaudio.com/products/details/icade; 2012; pp. 1-6.

\* cited by examiner

VIRTUAL MULTIPLE SIDED VIRTUAL ROTATABLE USER INTERFACE ICON QUEUE

RELATED APPLICATIONS

This application is a continuation-in-part of U.S. patent application Ser. No. 13/494,801 filed on Jun. 12, 2012, which in turn claims priority to U.S. Provisional Patent application Ser. No. 61/577,709 filed on Dec. 20, 2011.

SUMMARY

In a preferred embodiment an apparatus includes a tablet computer, the tablet computer preferably providing a plurality of sides, each of the plurality of sides are disposed between an electronic display screen and a back of the tablet computer, and an electronic game communicating with the tablet computer. The electronic game preferably provides an object displayed on the electronic display screen of the tablet computer, and movement of the object is controlled by an input device.

In a preferred embodiment, the input device includes at least a pair of side structures, one of the pair of side structures is adjacent to and confines the tablet computer on a first side of the plurality of sides of the tablet computer, the second side structure of the pair of side structures is adjacent to and confines the tablet computer on a second side of the plurality of sides of the tablet computer, wherein the first and second sides of the plurality of sides of the tablet computer are opposing sides of the plurality of sides of the tablet computer. The input device further preferably includes a plurality of input switches, wherein the input switches are adjacent each of the at least two opposing sides of the plurality of sides of the tablet computer, and a bridge structure disposed between the pair of side structures and adjacent a third side of the plurality of sides of the tablet computer. The bridge structure in combination with the pair side structures form a three sided structure in which the tablet computer nests such that the tablet computer is confined by the three sided structure, and the three sided structure mitigates inadvertent removal of the tablet computer from the three sided structure when the tablet computer is fully nested within the three sided structure.

DETAILED DESCRIPTION

The present disclosure generally relates to an apparatus directed to controlling electronic games, also referred to herein as video games, or computer games. The apparatus preferably includes a tablet computer, an electronic game communicating with the tablet computer, and an input device for controlling movement of a virtual object provided by the electronic game. Preferably, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

Figure 1:
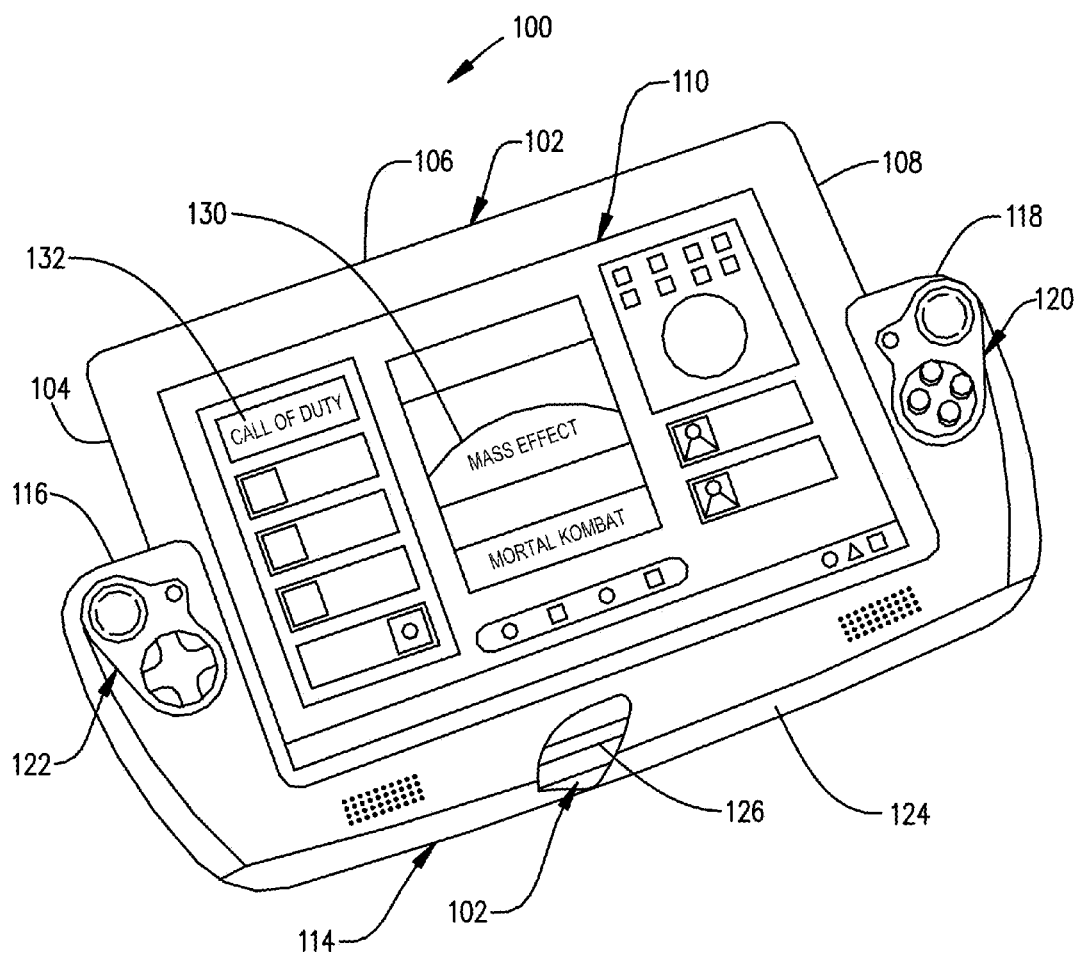
FIG. 1 is a front perspective view, with partial cutaway, of an embodiment an electronic game control apparatus constructed and operated in accordance with various embodiments disclosed and claimed herein.

Turning to the drawings, FIG. 1 provides an exemplary game controller 100 capable of being used in accordance with various embodiments of the present invention. The exemplary game controller 100 has at least a tablet computer 102 that providing a plurality of sides, such as 104, 106, 108, and 126. Each of the plurality of sides 104, 106, and 108 are disposed between an electronic display screen 110, of the tablet computer 102, and a back 112 (shown by FIG. 2) of the tablet computer 102 operates. The exemplary game controller 100 further preferably includes an input device 114.

In a preferred embodiment, the input device 114 provides a pair of side structures, 116 and 118. One of the pair of side structures, for example 116, is adjacent to and confines the tablet computer 102 on a first side, such as 104 of the plurality of sides 104, 106, 108, and 126 of the tablet computer 102. The second side structure of the pair of side structures, such as 118, is adjacent to and confines the tablet computer 102 on a second side, such as 108, of the plurality of sides 104, 106, 108, and 126 of the tablet computer 102, wherein the first and second sides, such as 104 and 108, of the plurality of sides 104, 106, 108, and 126 of the tablet computer 102 are opposing sides of the plurality of sides 104, 106, 108, and 126, of the tablet computer 102.

In a preferred embodiment, the input device 114 further provides a plurality of input switches 120 and 122, wherein the input switches 120 and 122 are adjacent each of the at least two opposing sides 104 and 108, of the plurality of sides 104, 106, 108, and 126, of the tablet computer 102, and a bridge structure 124, disposed between the pair of side structures 116 and 118, and adjacent the third side 126, of the plurality of sides 104, 106, 108, and 126, of the tablet computer 102. The bridge structure 124 in combination with the pair of side structures 116 and 118 form a three sided structure 128 (of FIG. 5) (also referred to herein as a u-shaped structure 128 of the input device 114), in which the tablet computer 102 nests, such that the tablet computer 102 is confined by the u-shaped structure 128, and the u-shaped structure 128 mitigates inadvertent removal of the tablet computer 102 from the u-shaped structure 128 when the tablet computer 102 is fully nested within the three sided structure 128.

The exemplary game controller 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of a character. It is noted that FIG. 1 displays the housings of the plurality of switches, whereas at least some of the plurality of switches are shown in the partial cutaway of FIG. 3.

Figure 2:
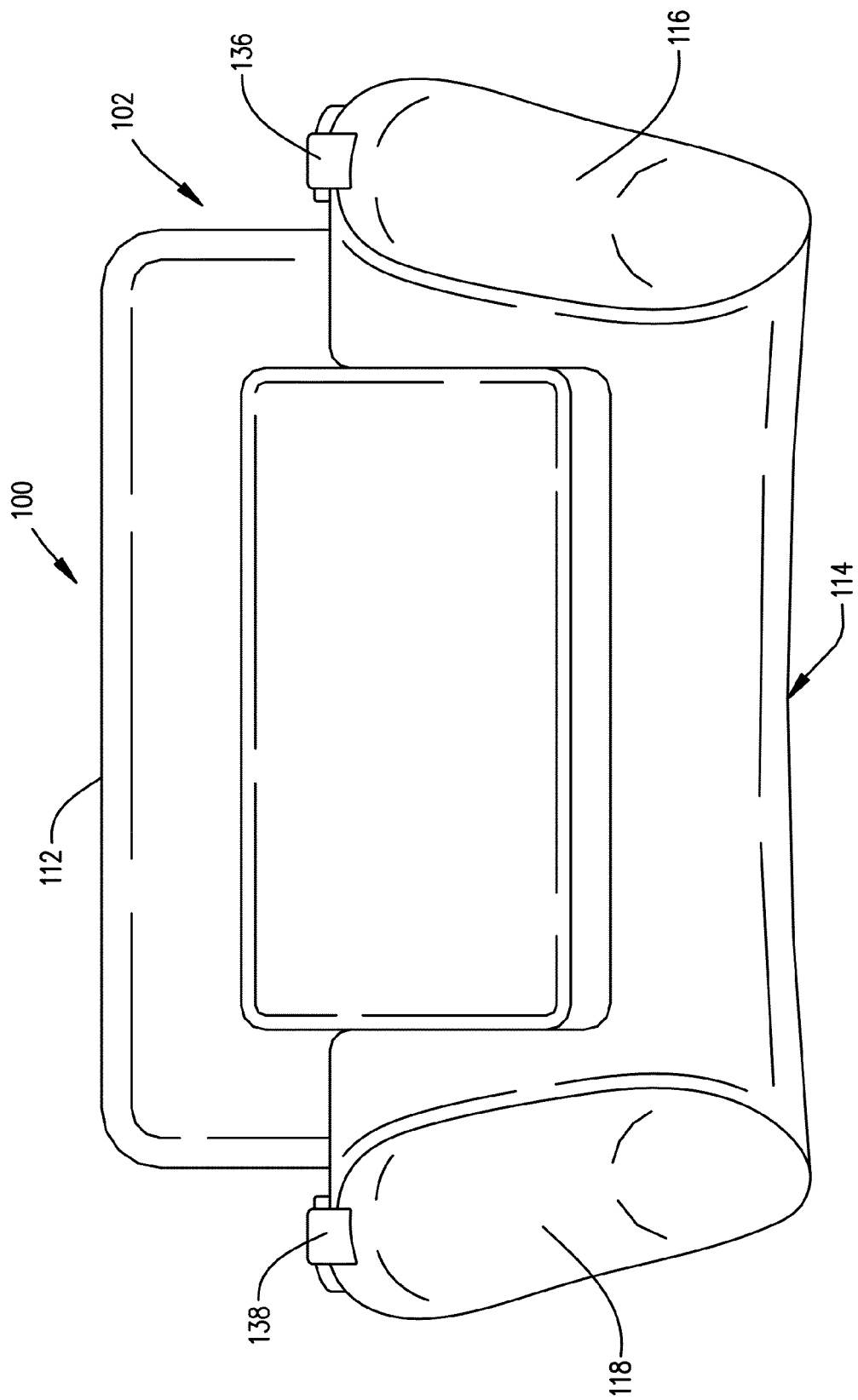
FIG. 2 shows a back plan view of the apparatus of FIG. 1.

FIG. 2 depicts the, and reveals the back 112 of the tablet computer 102. Further shown by FIG. 2, is the input device 114, which provides a pair of trigger switches 136 and 138, supported by their corresponding side structures 116 and 118 respectively.

Figure 3:
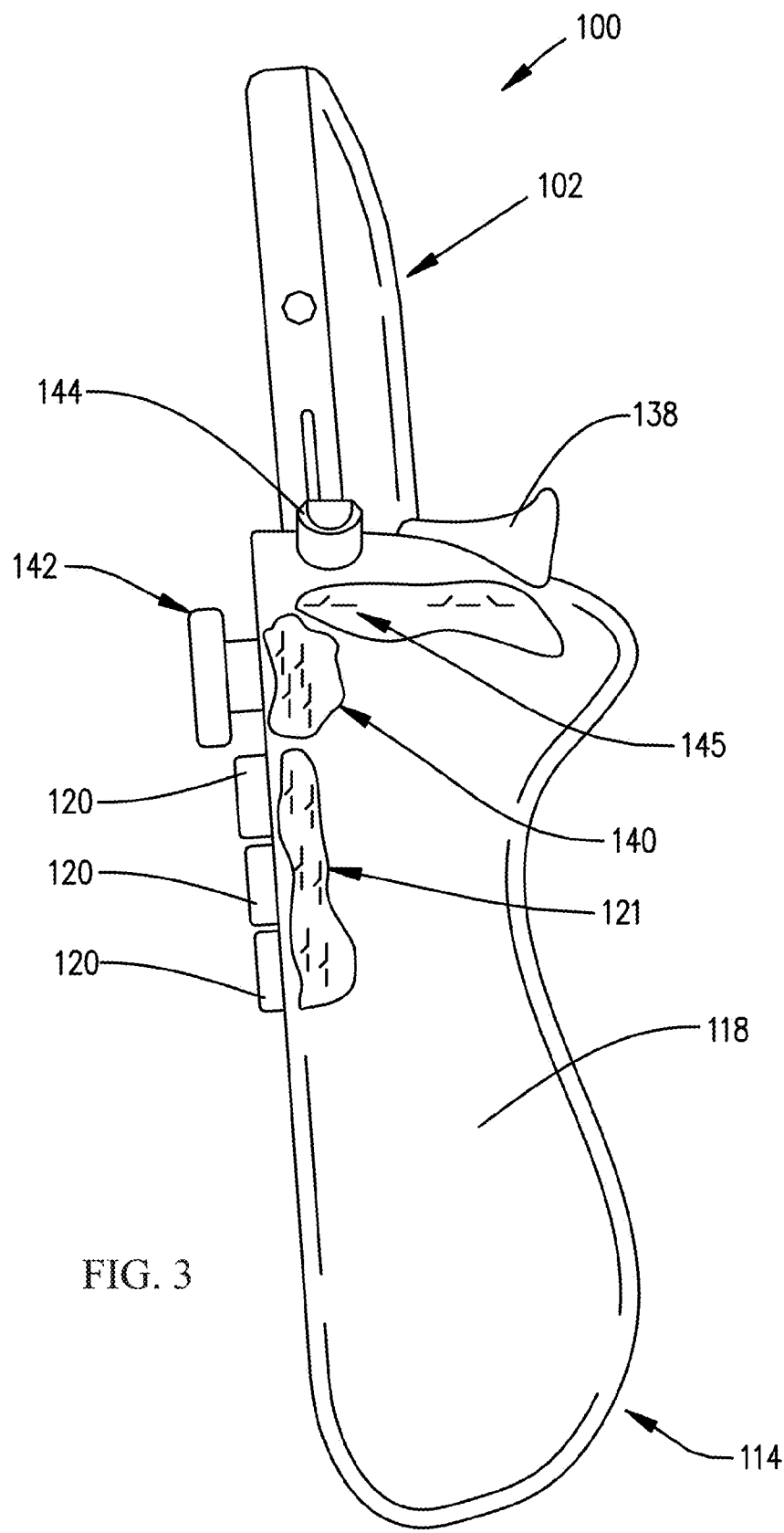
FIG. 3 displays a right side plan view, with partial cutaway, of the apparatus of FIG. 1, constructed in accordance with various embodiments disclosed and claimed herein.

Turning to FIG. 3, shows that a predetermined number of the plurality of switches 140, collaborate with each other to form an input apparatus 142, the input apparatus 142 controls display of virtual objects displayed on the electronic display screen 110 of the tablet computer 102. Preferably, the input apparatus 142 is a joystick 142. FIG. 3 further shows that the input device 114 provides a plurality of buttons 144 and 120 which activate corresponding switches 145 and 121. The main function of the trigger 138, the joystick 142, and the buttons 144 and 120 is to govern the movement/actions of a playable body/object or otherwise influence events in a video game 130 (of FIG. 1) or an alternate computer game.

Figure 4:
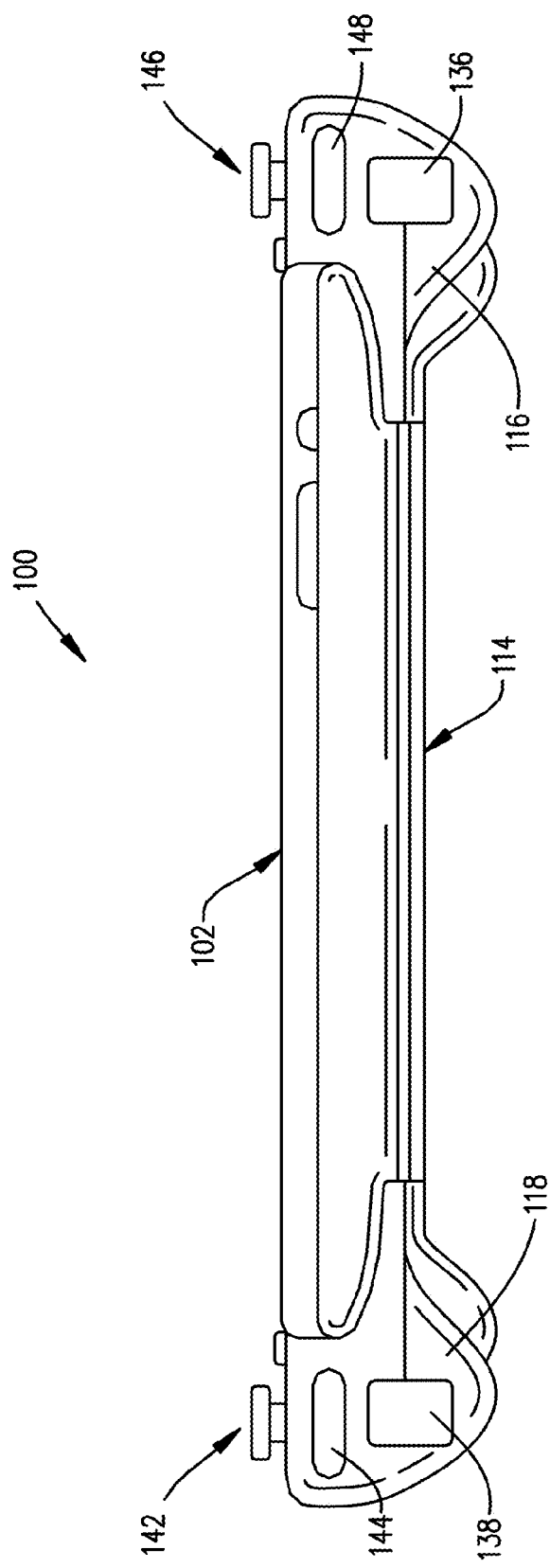
FIG. 4 depicts a right side plan view of the apparatus of FIG. 1, constructed in accordance with various embodiments disclosed and claimed herein.
Figure 5:
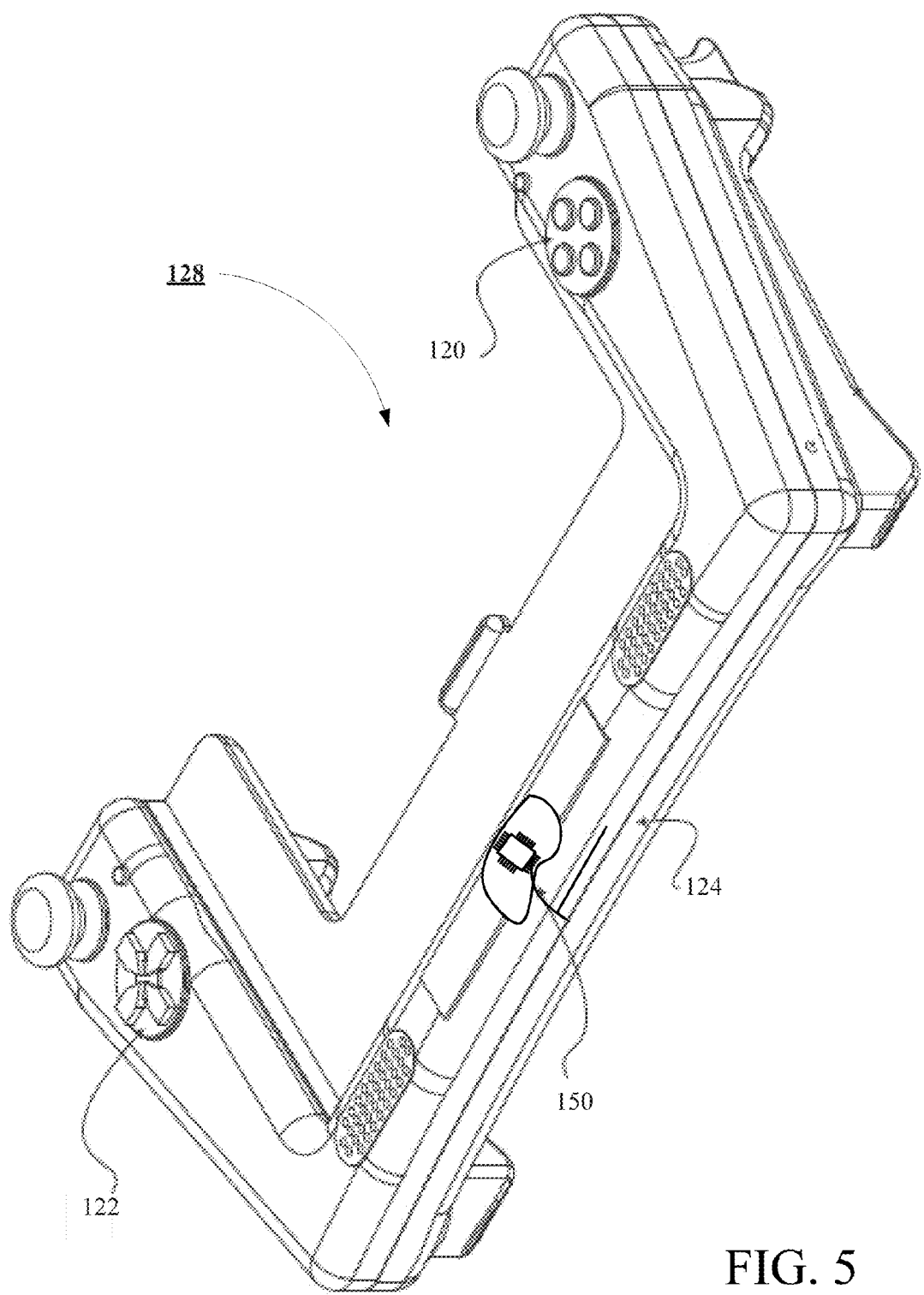
FIG. 5 illustrates a top perspective view of an embodiment of an input device of FIG. 1, constructed in accordance with various embodiments disclosed and claimed herein.

FIG. 4 shows the exemplary game controller 100, further includes a second joystick 146, and a second button 148, which are provided on the side structure 116, adjacent trigger 136. While FIG. 5 shows the central processing unit (CPU) 150, of the input device 114.

Figure 6:
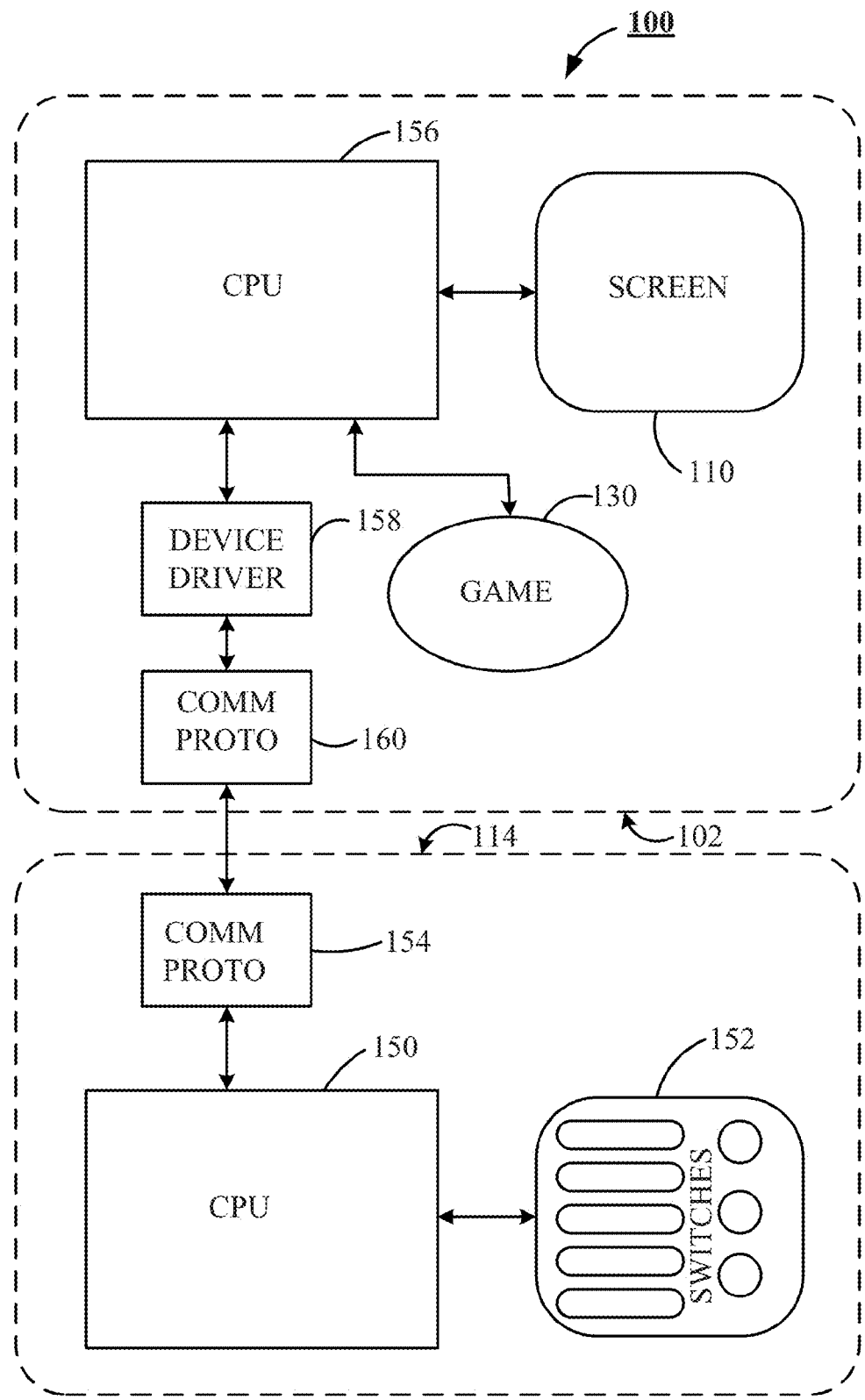
FIG. 6 is a block diagram of an embodiment of the apparatus of FIG. 1.

FIG. 6 shows the input device 114 includes the CPU 150, interacting with the plurality of switches 152, which preferably include at least switches 120, 122, 136, 138, 142, 144, 146, and 148. FIG. 6 further shows the input device 114 further includes a communications protocol 154 providing the communication link between the tablet computer 102, and the input device 114. In a preferred embodiment a Universal Serial Bus (USB) communications protocol is utilized. However, as those skilled in the art will recognize, the communications protocol 154 is not limited to a USB protocol. Preferably, the input device 114 further incorporates Bluetooth Protocol Stack communications implementation, for enhanced device communications.

FIG. 6 further shows that the tablet computer 102 preferably includes at least a CPU 156, interacting with the electronic display screen 110, the video game 130, a device driver 158, which facilitates the interaction between the tablet computer 102 and the input device 114, and a communications protocol 160 providing the communication link between the tablet computer 102, and the input device 114. In a preferred embodiment a Universal Serial Bus (USB) communications protocol is utilized. However, as those skilled in the art will recognize, the communications protocol 160 is not limited to a USB protocol. Preferably, the tablet computer 102 further incorporates Bluetooth Protocol Stack communications implementation, for enhanced device communications.

Figure 7:
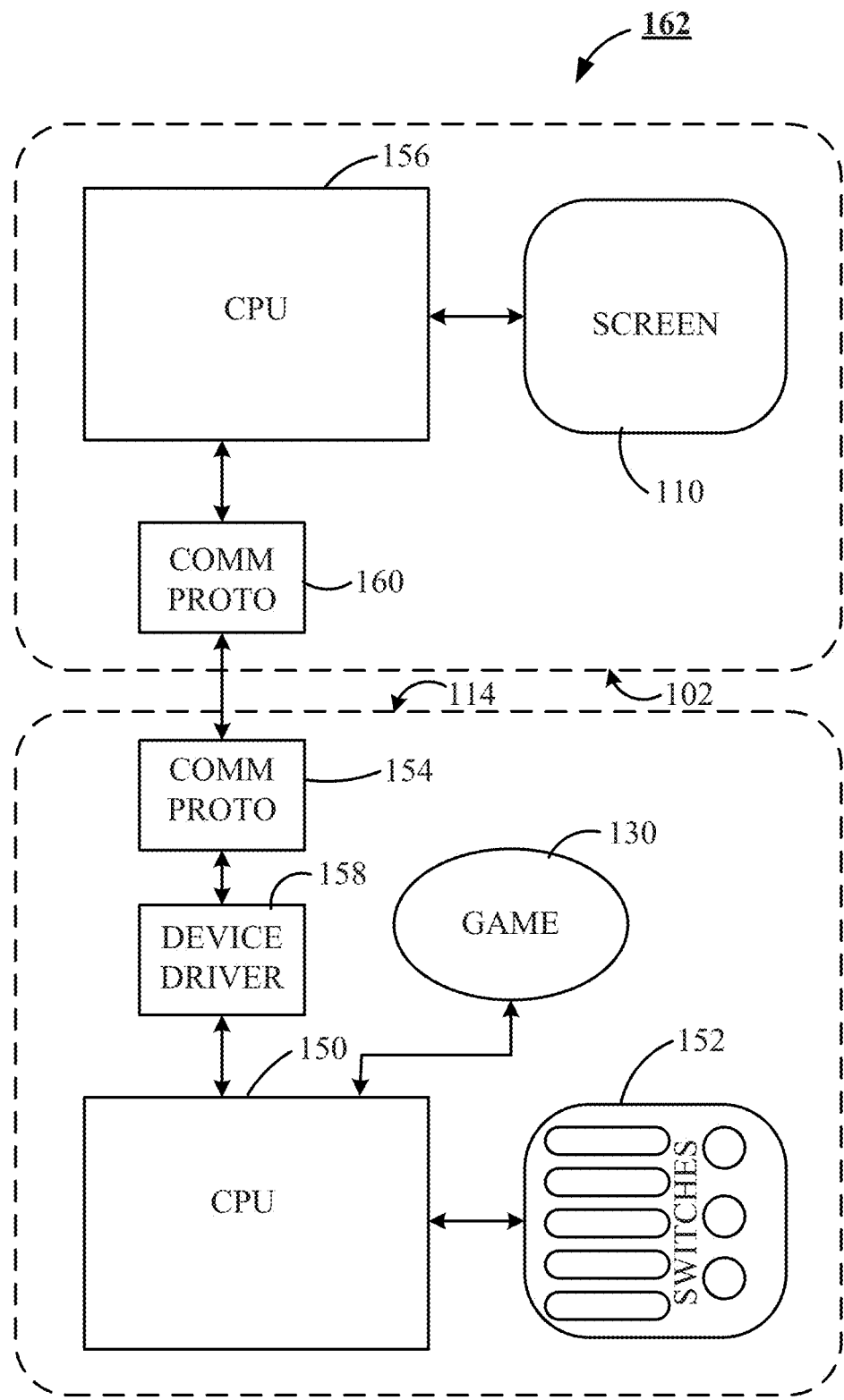
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

Figure 8:
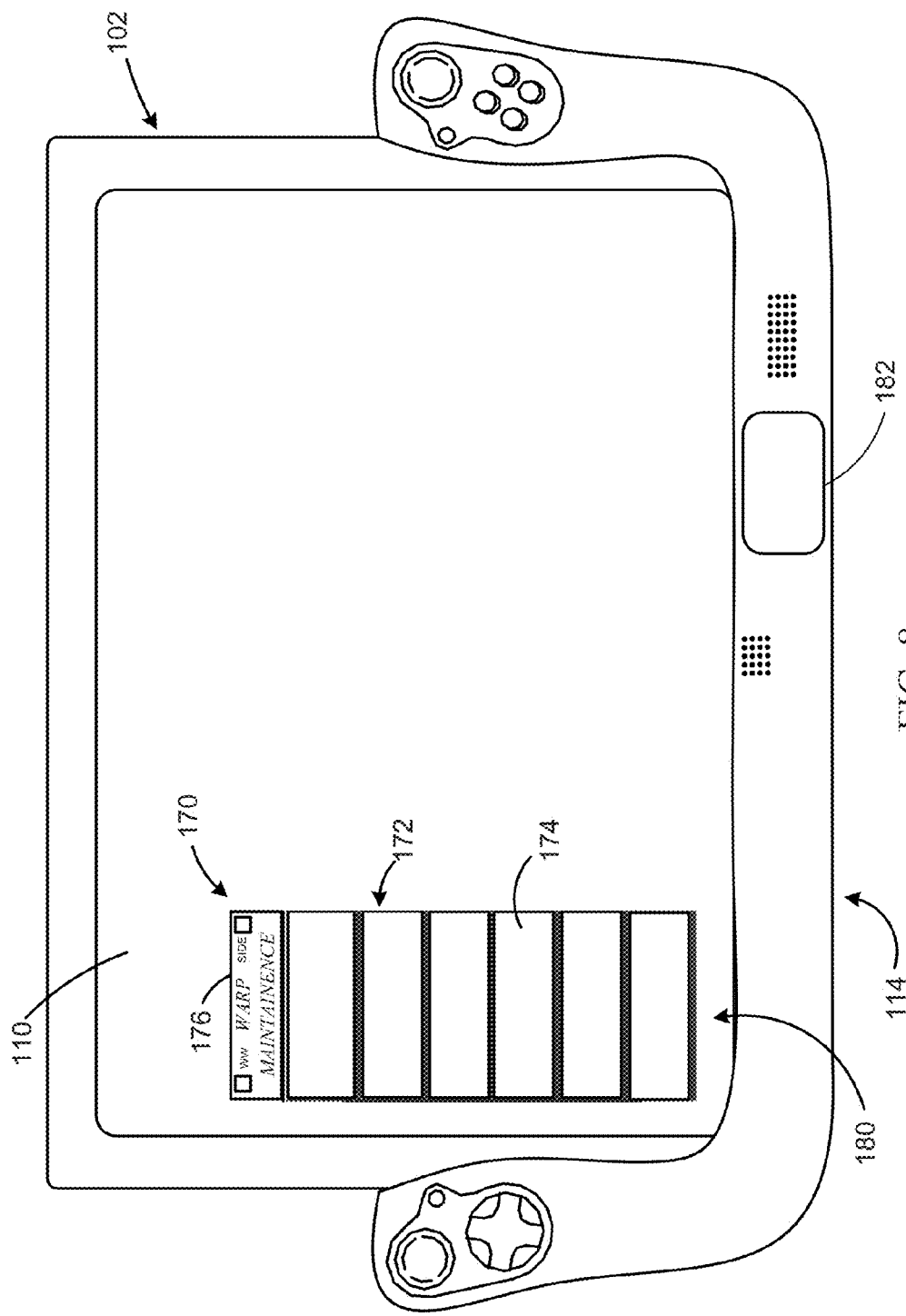
FIG. 8 shows an embodiment of a virtual multiple sided virtual rotatable user interface icon queue computer application ("warp widget") displayed on an electronic display screen of the apparatus of FIG. 1.
Figure 12:
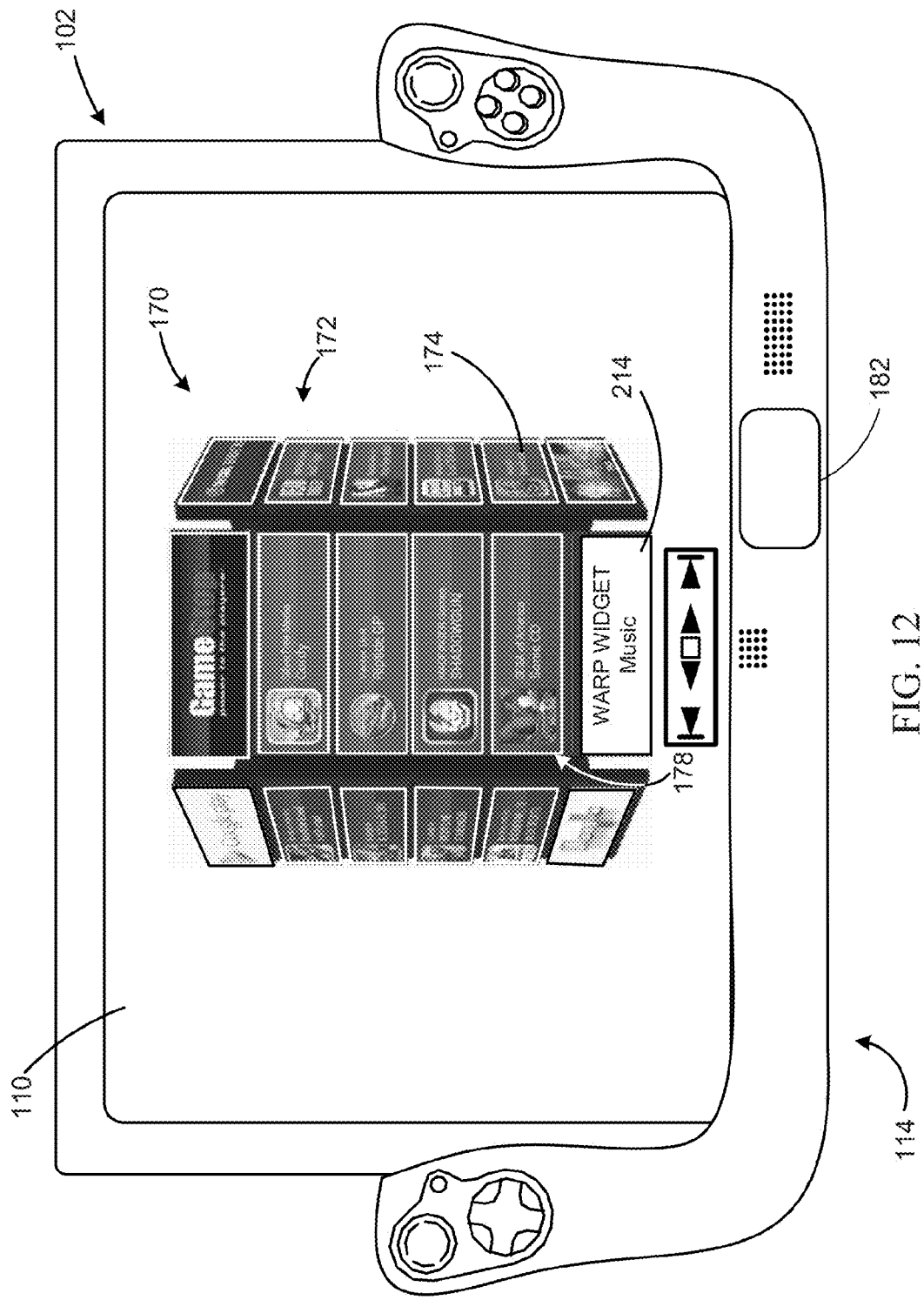
FIG. 12 illustrates the warp widget of FIG. 10 in an expanded, populated, operating mode.

FIG. 8 shows an embodiment of a virtual multiple sided virtual rotatable user interface icon queue computer application 170, also referred to herein as a warp widget 170. The warp widget 170 is configured for display on the electronic display screen 110, or portion thereof, of the tablet computer 102. The warp widget 170, as shown by FIG. 8, is presented in a non-active, unpopulated, retracted mode, and displays a side 172 of the virtual multiple sides of the plurality of sides. Each side 172 of the virtual multiple sides presents a plurality of cells 174, and a maintenance button 176. Preferably, each cell 174 provides a portal that displays a predetermined application icon, such as 178 of FIG. 12. Each cell 174 further responds, to an activation request of the user, by activating a computer application associated with the predetermined application icon 178 presented by a cell 174 of a front facing side 172, when said warp widget 170 is displayed in an expanded, populated, active mode as shown by FIG. 12.

Figure 10:
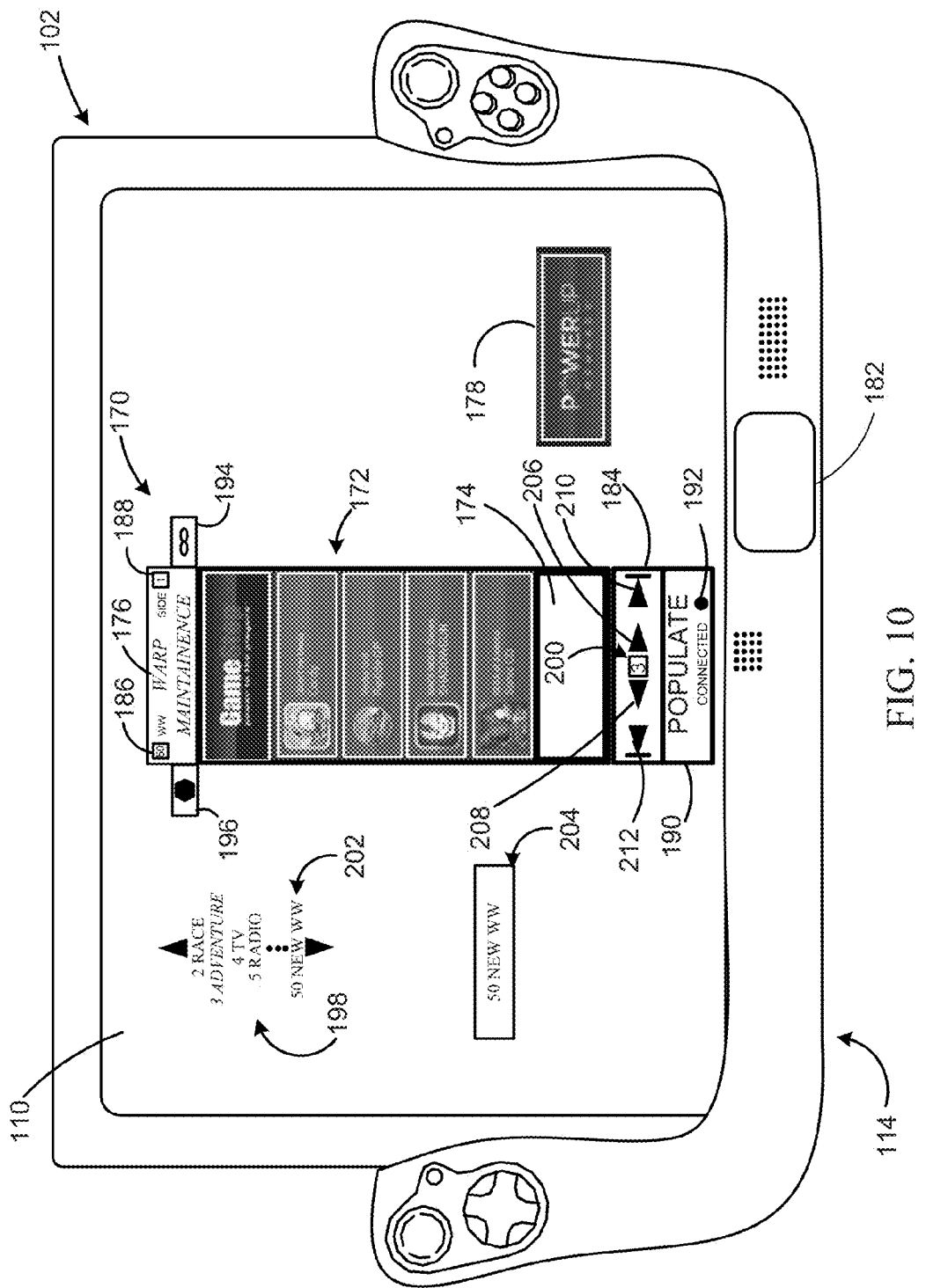
FIG. 10 shows the warp widget of FIG. 9 in a more detailed expanded, populated maintenance mode.
Figure 11:
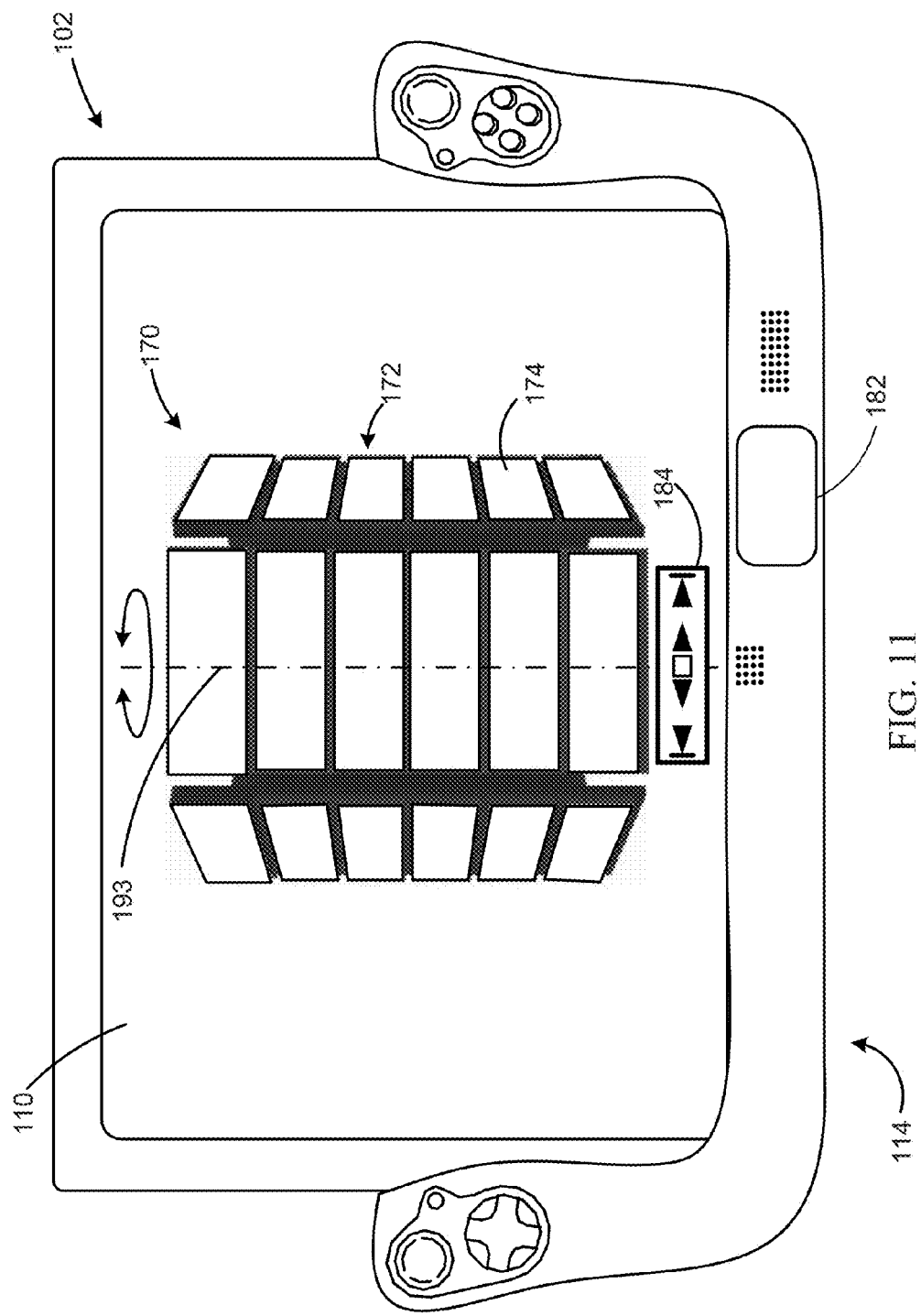
FIG. 11 shows the warp widget of FIG. 8 in an expanded, non-populated, operating mode.

In the expanded active mode, the warp widget 170 appears, during virtual rotation, to have six sides. However, the warp widget 170 is configured to sequentially display as many sides 172 as needed to accommodate as many cells 174 as needed to house individual application icons 178 of the warp widget 170. In a preferred embodiment, six cells 174 are provided per side 172, but the number of sides 172 presented could be more or fewer than six cells 174 presented pre side 172 as shown in FIGS. 10 and 11.

As shown in FIG. 8, the warp widget 170 is displayed in a home position 180, on the electronic display screen 110. The home position 180 may be relocated to any area of the electronic display screen 110 by dragging and dropping the warp widget 170. Preferably, when the warp widget 170 appears in the home position 180, the response of the warp widget 170 to activation by a user depends on where on the displayed side 172 the user interacts with the warp widget 170. Preferably, such an activation occurs with a tap on the electronic display screen 110 (when the electronic display screen 110 is a touch screen), but may occur by clicking a mouse button, or tapping an auxiliary display module 182 (ADM 182), which when selected to function as a mouse touch pad, controls a pointer tool displayed on the electronic display screen 110.

Figure 20:
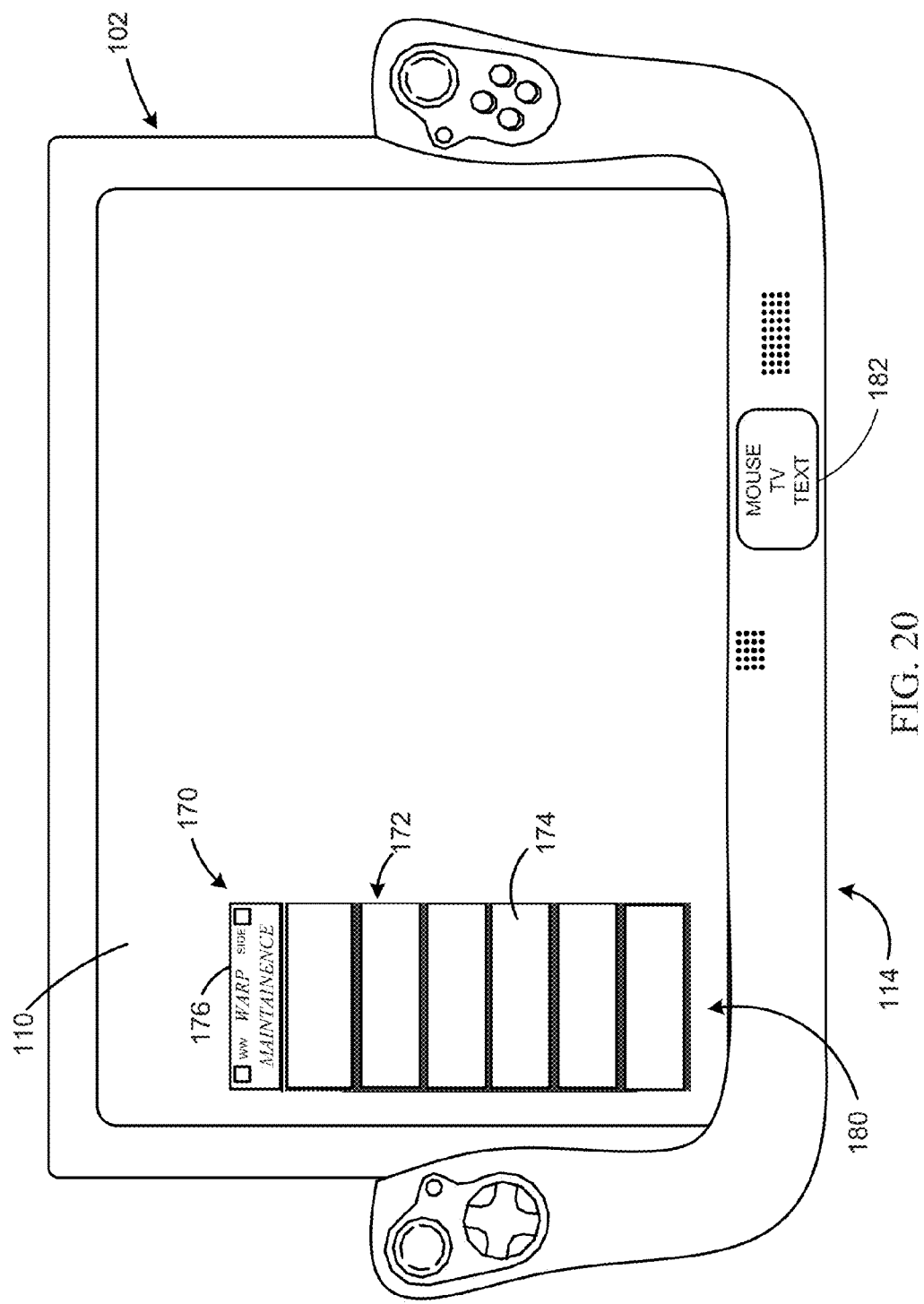
FIG. 20 presents the warp widget of FIG. 8 with an auxiliary display module presenting a selection of operating modes to the user.

In a preferred embodiment, the ADM 182 is an auxiliary electronic display screen with at least the functionality of the electronic display screen 110. In a preferred embodiment, the simultaneous activation of the trigger switches 136 and 138 of FIG. 4, serve to turn on the ADM 182. Preferably, when the ADM 182 comes ready, the user is presented with at least the options of selecting the ADM 182 to serve as a mouse pad in the foreground, and a data presentation display in the background; an interactive television volume and channel selection control in the background, and a mouse pad in the foreground; or as a text messaging window in the background and a mouse pad in the foreground, as shown by FIG. 20.

Figure 17:
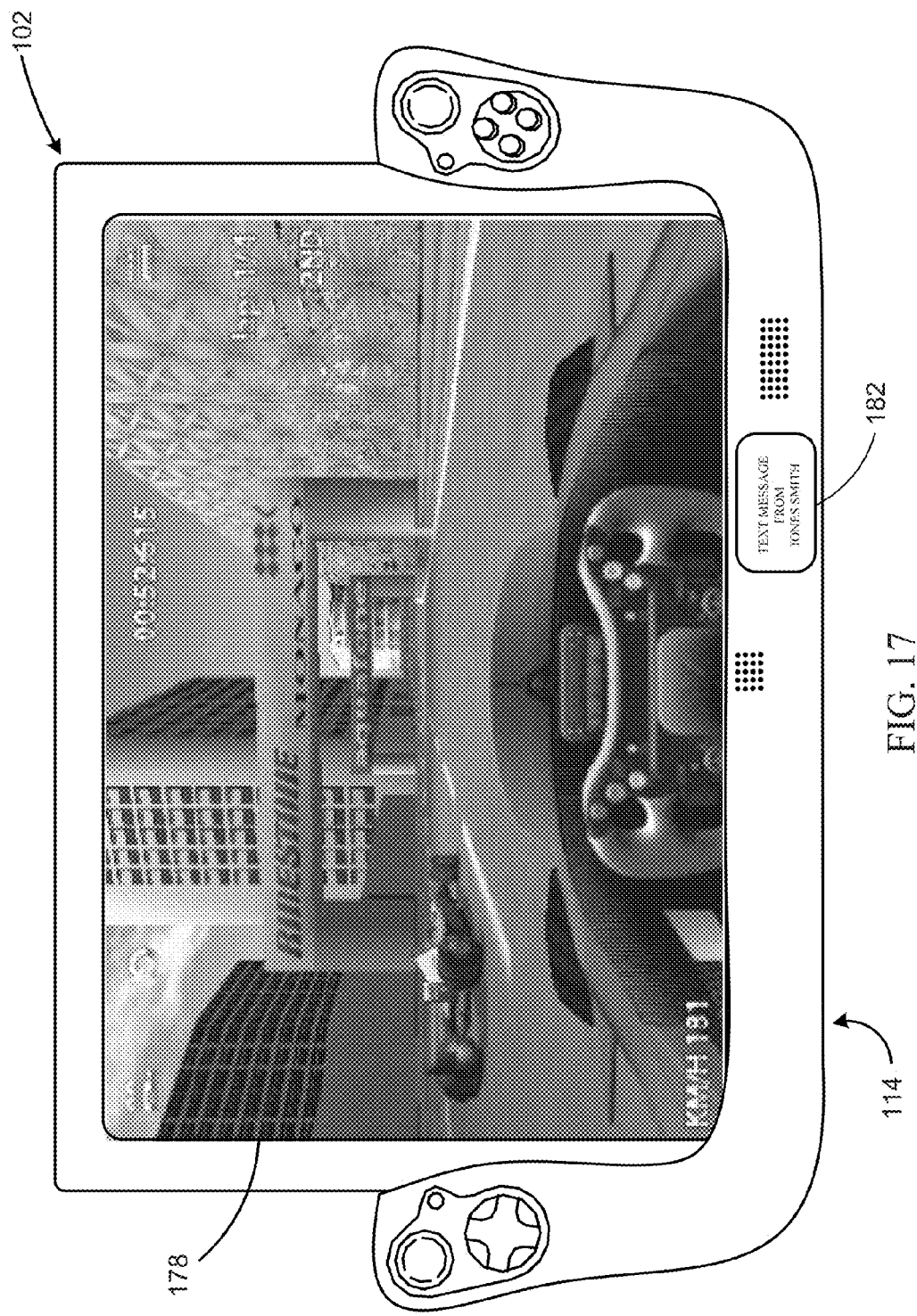
FIG. 17 illustrates the warp widget of FIG. 12 in a video game playing mode.

Preferably, when selecting the mouse mode, the ADM 182 is configured to control the response of a pointer tool on the electronic display screen 110, and to interact with any paired Bluetooth device, such as a cell phone, by presenting information provided by the paired device such as, but not limited to, notification of a pending incoming call, the receipt of a text message, voice mail, or a tweet, while the user is occupied playing a video game, such as that shown by FIG. 17, or downloading a new application, video game, media content link, or recording an event.

Figure 21:
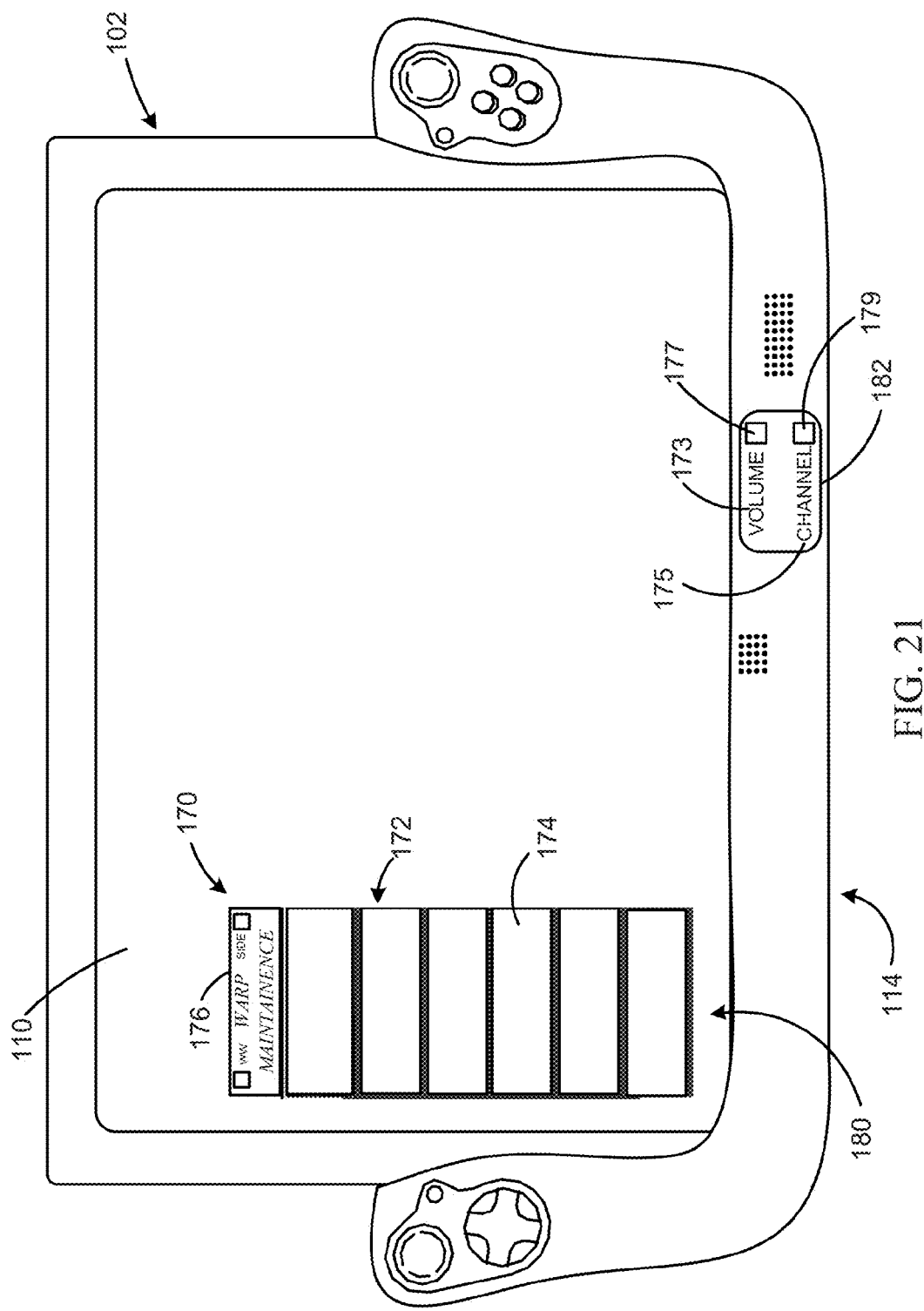
FIG. 21 presents the warp widget of FIG. 20 with an auxiliary display module presenting the TV control mode selected by the user.

Preferably, with the input device paired with a television set ("TV"), when selecting the TV mode, the ADM 182 is configured to control the response of a pointer tool on a screen of the TV, and to interact with the TV by providing at least a volume control feature 173 and channel selection navigation tool 175, as shown by FIG. 21. Preferably, each the volume control feature 173 and channel selection navigation tool 175 includes activation buttons 177 and 179 respectively.

Figure 22:
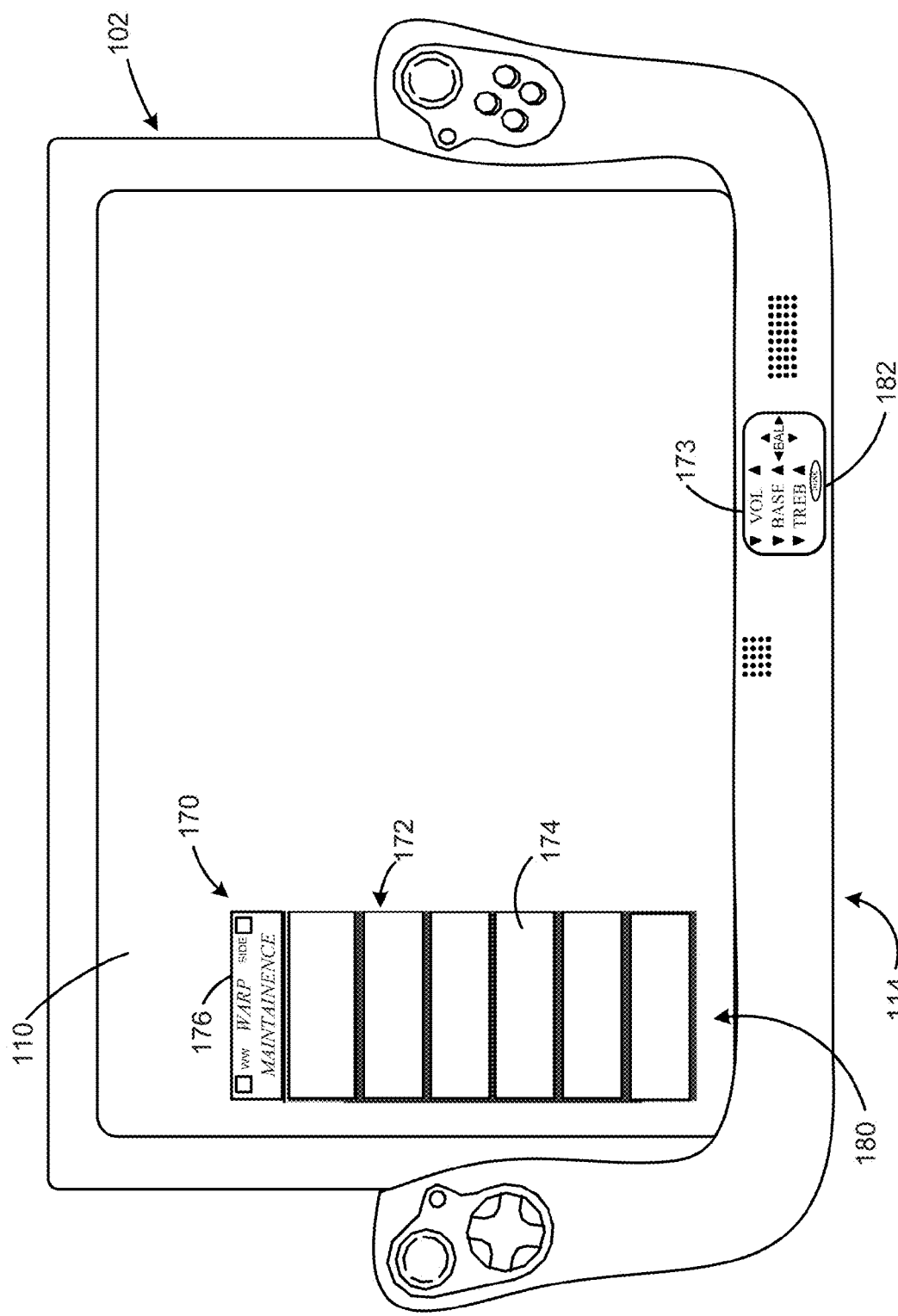
FIG. 22 presents the warp widget of FIG. 21 with an auxiliary display module presenting the audio controls based on a selection by the user of the volume mode of FIG. 21 selected by the user.

In a preferred embodiment, when the activation button 177 of the volume control feature 173 is double tapped, the mouse pad features are suspended, a volume control screen appears, as shown by FIG. 22, and the user can adjust the audio output of the TV. When the audio output of the TV is at a desired level, the user taps the done button of the volume control feature 173, and the mouse pad function is re-activated and the volume control feature 173 is deactivated.

Figure 23:
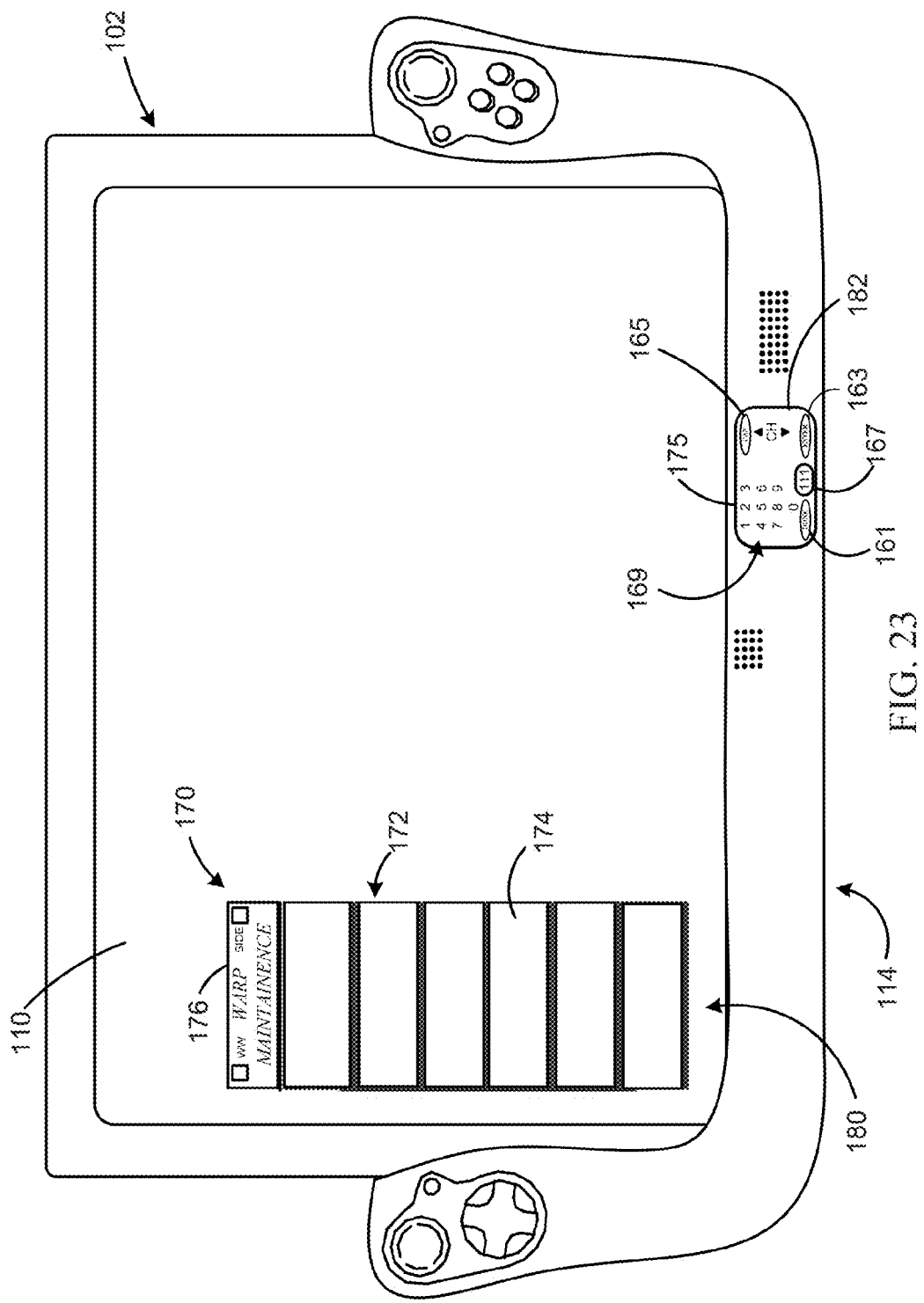
FIG. 23 presents the warp widget of FIG. 21 with an auxiliary display module presenting the channel controls based on a selection by the user of the channel mode of FIG. 21 selected by the user.

Further in a preferred embodiment, when the activation button 179 of the channel selection navigation tool 175 is double tapped, the mouse pad features are suspended and the user can select an alternate channel of the TV by interacting with the channel selection screen 169 shown by FIG. 23. Preferably, when interacting with the channel selection screen 169, a channel display 167 shows the channel selected by the user, if the channel is not the channel desired by the user, the user may tap the cancel button 165. If however the channel display 167 displays the desired channel, the user may tap the enter button 163, and when the TV is at a desired channel, the user taps the done button 161, and the mouse pad function is re-activated and the channel selection navigation tool 175 is deactivated. It is noted that in a preferred embodiment, while the volume control feature 173 and channel selection navigation tool 175 are deactivated, they continue to appear in the background of the activated mouse pad. In a preferred embodiment, when the mouse pad is active in the foreground, the mouse pad is fully functional.

Figure 16:
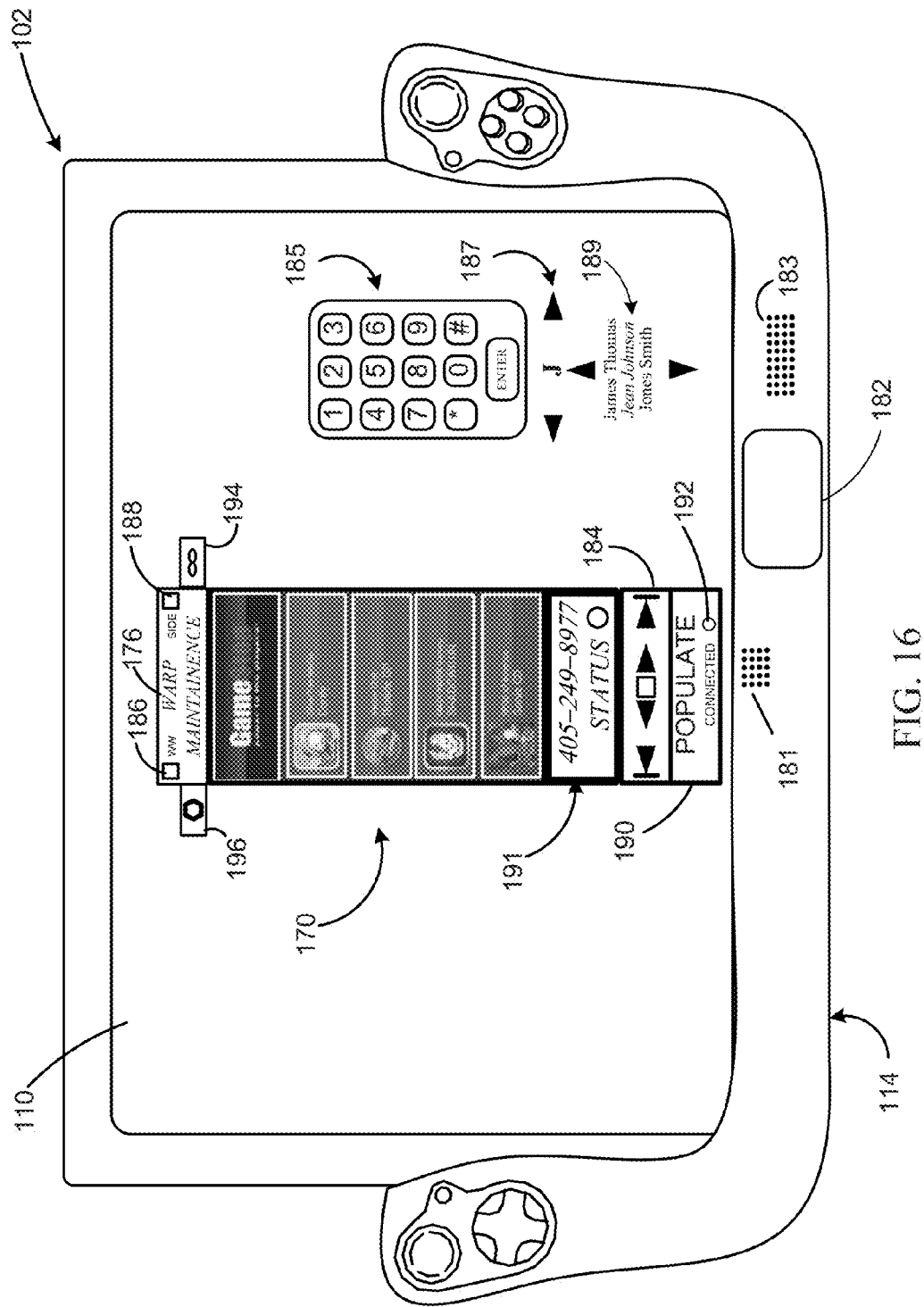
FIG. 16 shows the warp widget of FIG. 12 in a maintenance mode, and the tablet computer in a phone interactive mode.
Figure 18:
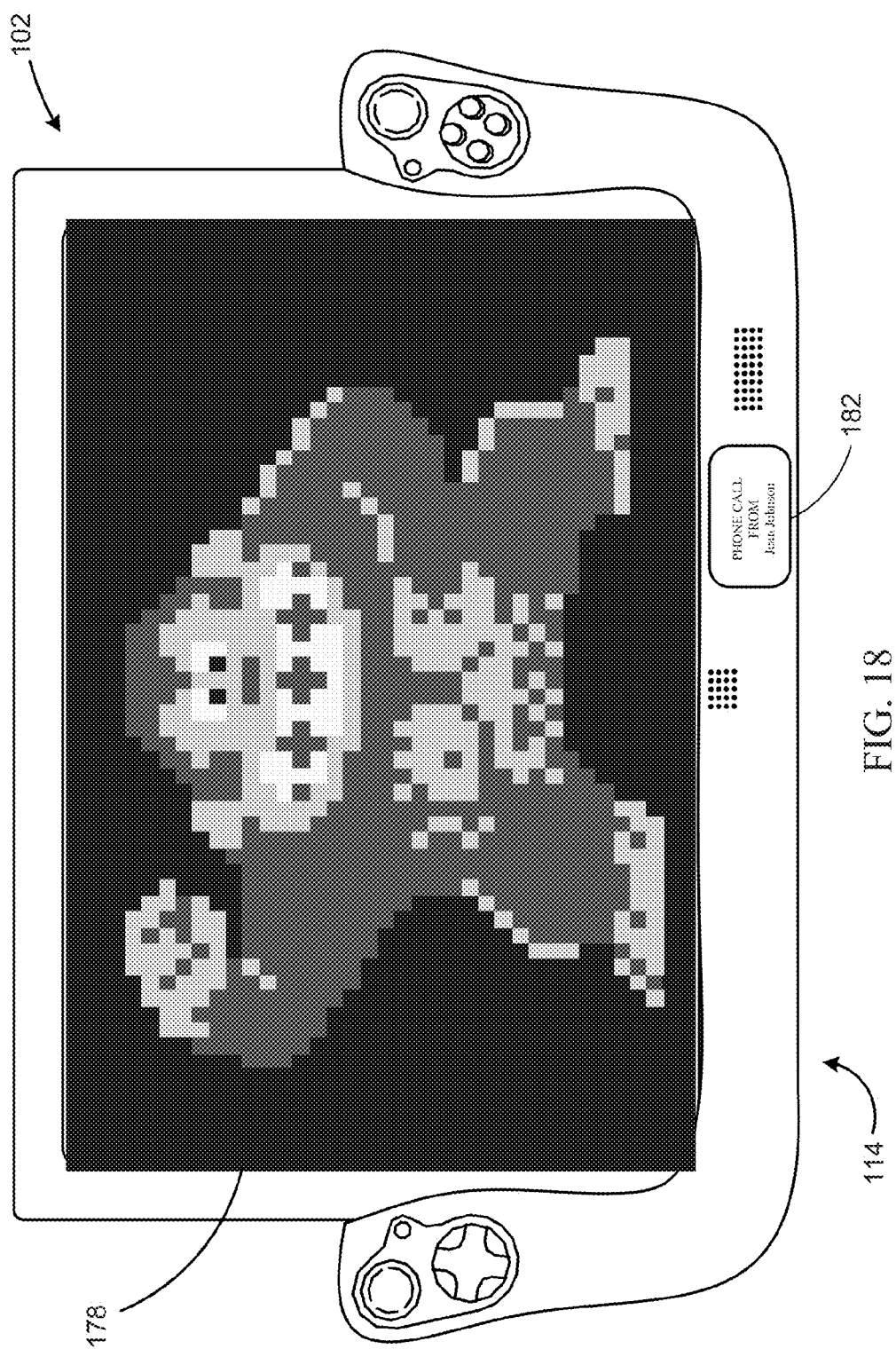
FIG. 18 displays the warp widget of FIG. 17 in an alternate video game mode the response of the system to an incoming phone call during game play.

In a non-limiting example, with an active paired cell phone, when an incoming call is received by the cell phone, the caller identification information (when available) is displayed, as shown by FIG. 18. If the user elects to answer the incoming call, by tapping the ADM 182 of FIG. 18, the activity engaged in by the user (in this example; playing a video game) is suspended, and a microphone 181, and a speaker 183 of FIG. 16, are activated, unless the user has a headset or ear piece microphone and speaker device interacting with the tablet computer 102, or the input device 114, in which case the user utilizes the headset or ear piece microphone and speaker device to interact with the caller.

In furtherance of the non-limiting example, if the user chooses to not answer the incoming call, the caller information will remain on the ADM 182 after the caller has ended the call on their end, and remain available to the user. When the user chooses to discontinue the activity being carried out on the tablet computer 102, and taps the ADM 182, the system responds by reverting to a maintenance mode presentation of the warp widget 170 and a presentation of a dialing pad 185, a contacts navigation feature 187, and a contacts list 189, as shown by FIG. 16. Preferably, the contacts list 189 has highlighted the source of the last incoming call (which in this example is Jean Johnson). With the source of the last incoming call highlighted, the user need only tap the enter key of the dialing pad 185 to return the call.

In a preferred embodiment, the contacts navigation tool 187 is useful in navigating to alphabetized contact lists 189, which can be displayed by scrolling to a desired letter of the alphabet. The contacts list 189 is useful in selecting a particular contact of interest by scrolling to the desired contact within the contact list 189. By tapping on a selected contact of interest, that selected contact is highlighted in the contact list 189, and by tapping, or clicking on the enter key of the dialing pad 185, a call will be placed to the selected contact within the contact list.

In continued furtherance of the non-limiting example, when a cell phone is paired to either the tablet computer 102, or the input device 114, the paired device is automatically placed into the warp widget 170 and an application icon, as shown by sign number 191. Preferably, when the paired phone application icon 191 is activated, by tapping or clicking on the application icon 191, the dialing pad 185, the contacts navigation feature 187, and a contacts list 189, appear on the electronic display screen 110, as shown by FIG. 16, which function as described hereinabove.

Returning to FIG. 8, in an alternate embodiment, maneuvering of the joystick 142 and an activation of either predetermined trigger switch 136 or 138 of FIG. 4, functions as an activation technique for activating the warp widget 170. In the alternate preferred environment, when the user is interacting with the warp widget 170, the joystick 142 serves to maneuver a pointer tool displayed on the electronic display screen 110, the trigger switch 138 serves as the right mouse button while the trigger switch 136 serves as the right mouse button.

Figure 13:
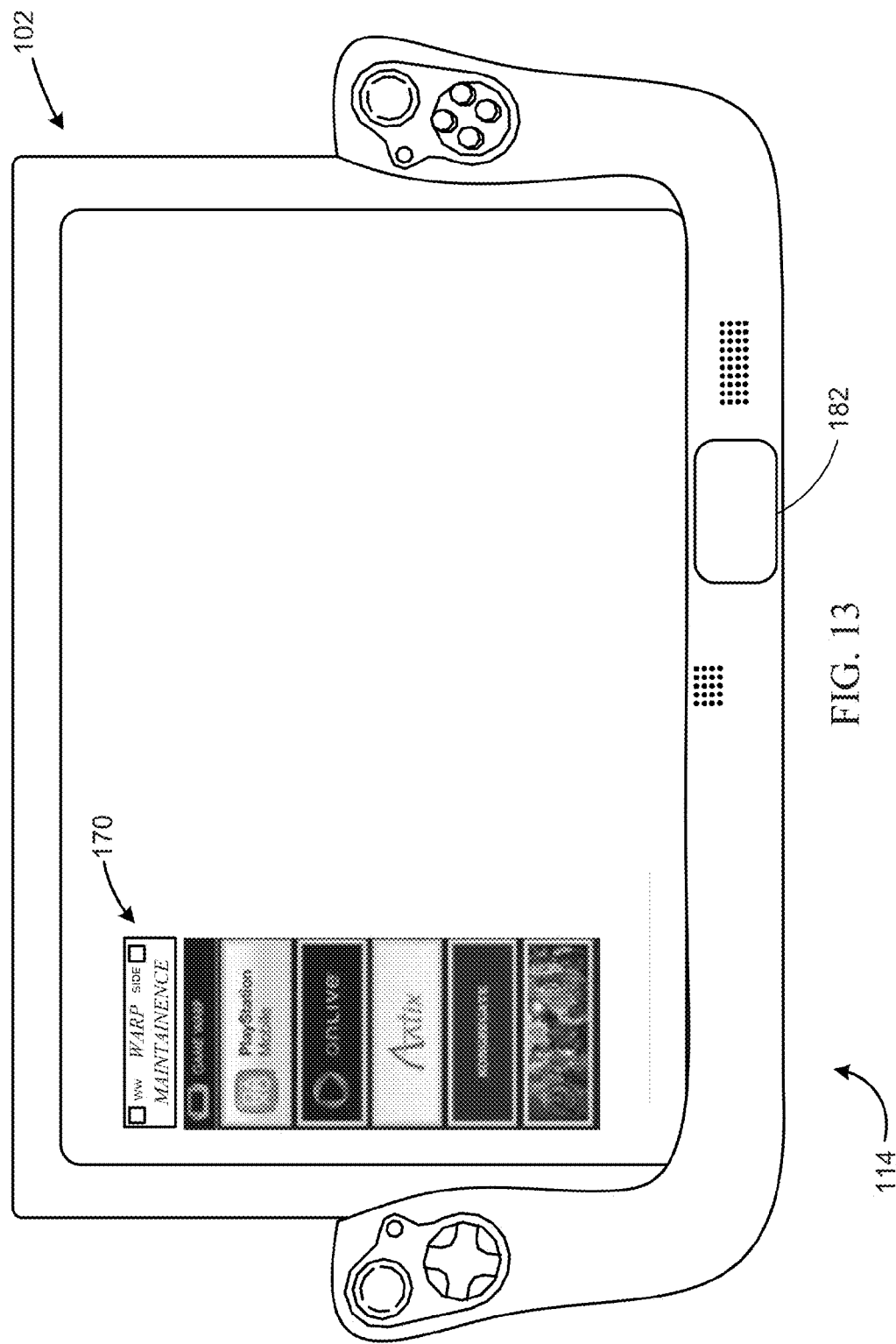
FIG. 13 displays an alternate, populated warp widget.
Figure 14:
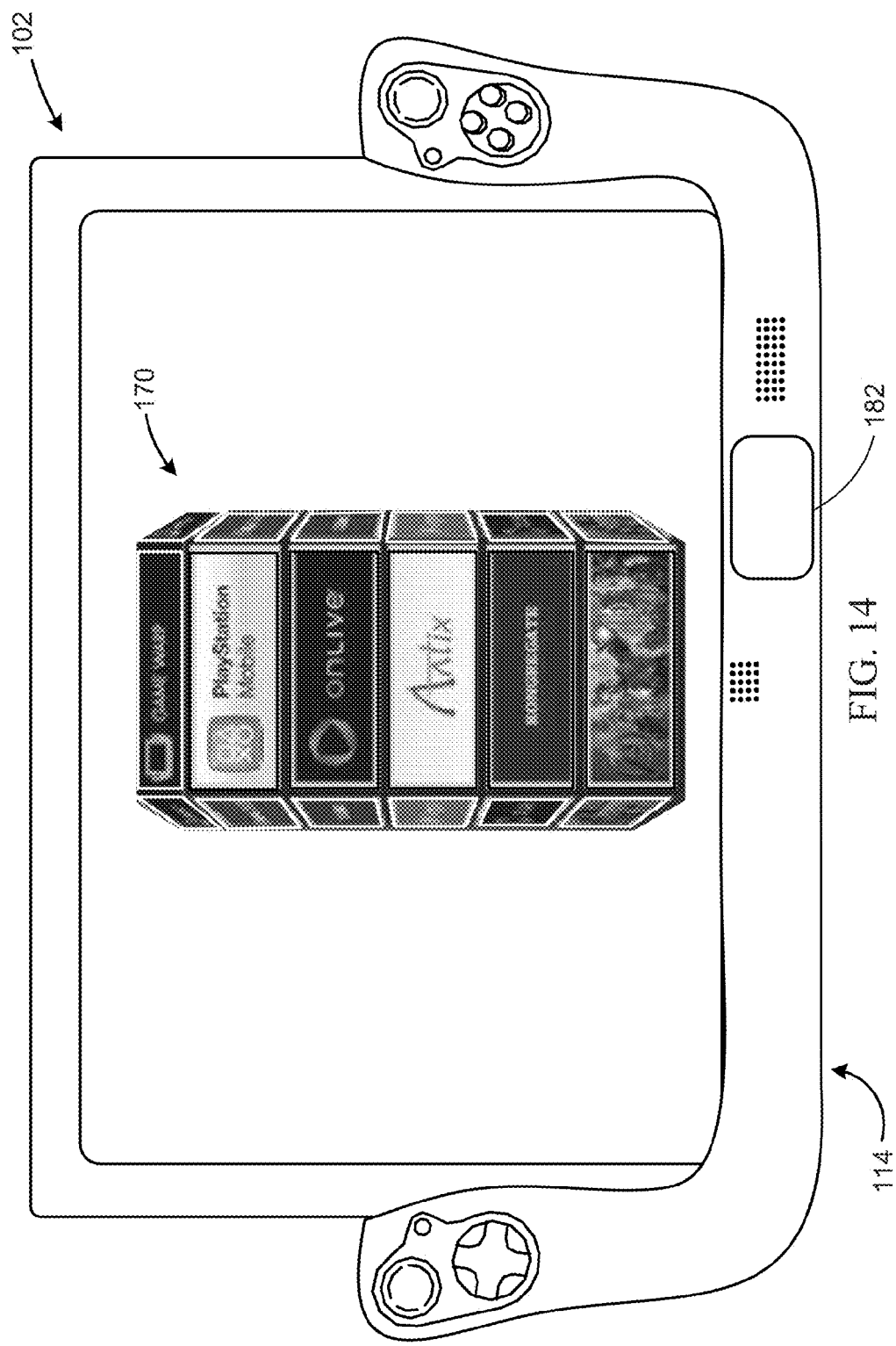
FIG. 14 shows the warp widget of FIG. 13 in an expanded, populated, operating mode.

Other than an interaction of the maintenance button 176 by the user, when the user interacts with any of the plurality of cells 174, the warp widget 170 responds by shifting to an expanded, unpopulated, active mode, as shown by FIG. 11, or to an expanded, populated, active mode, as shown by FIG. 12. The expanded, unpopulated, active mode, of the warp widget 170 as shown by FIG. 11, is the result of an activation of a retracted, unpopulated, inactive warp widget 170 as shown by FIG. 8. The expanded, populated, active mode, of the warp widget 170 as shown by FIG. 12 is the result of an activation of a retracted, populated, inactive warp widget 170 as shown by FIG. 12. It will be noted that in a preferred embodiment, when the warp widget 170 is in the expanded, (either populated or unpopulated), active mode as shown by FIGS. 11 and 12, the maintenance button 176, of FIGS. 8 and 13, is unavailable to the user. However, in an alternative preferred embodiment, when the warp widget is in the expanded, (either populated or unpopulated), active mode as shown by FIGS. 11 and 12, the maintenance button 176, of FIGS. 8 and 13, is made available to the user.

Figure 9:
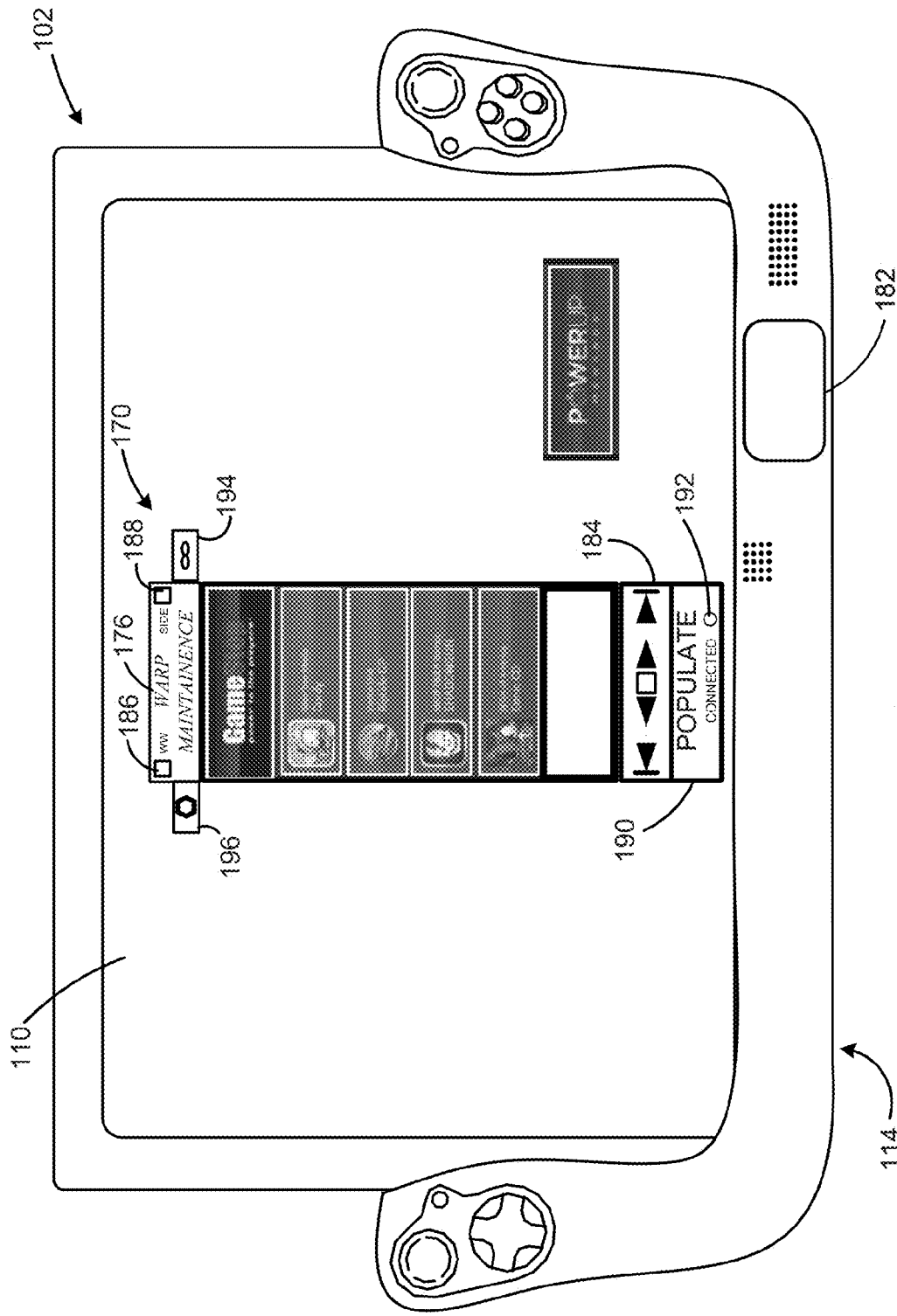
FIG. 9 depicts the warp widget of FIG. 8 in an expanded, populated maintenance mode.

Preferably, with the warp widget 170 in a home position, as shown by FIG. 8 or 13, when the user interacts with the maintenance button 176, the warp widget 170: moves to an alternate position on the electronic display screen 110; presents a navigation window 184; activates a warp widget spawning button 186 (also referred to herein as the WW button 186) of the maintenance button 176; populates a status window 188 of the maintenance button 176; presents a population button 190 that includes an internet connection condition indicator 192; and displays warp widget type indicators 194 and 196, all shown by FIG. 9.

In a preferred embodiment, when the status window 188 is populated, the user is informed of two things. First, which side 172 of the plurality of sides is being presented, and second that maintenance tasks may be performed on the warp widget 170. Additionally in the preferred embodiment, when the internet connection condition indicator 192 is present, the user is being informed that the warp widget 170 has established access to the internet.

In a preferred embodiment, in response to an interaction of the maintenance button 176 by the user, either the warp widget type indicator 194 is in force (which identifies the warp widget as an infinity sided warp widget 170), or the warp widget type indicator 196 is in force (which identifies the warp widget as a six sided warp widget 170). When the warp widget type is the infinity sided warp widget 170, and upon populating the initially available thirty six cells 174 of the warp widget 170, the warp widget 170 generates an additional side with, preferably, six additional cells 174 and updates the status window 188 showing the total number of sides of the warp widget 170. This procedure continues for as many application icons 178, the user chooses to place within the warp widget 170. In the preferred embodiment, the user has the option of adding an additional side by tapping the status window 188. The term application icon as used herein means at least a graphical representation of a launcher, which upon activation launches whatever application, device, media source (TV, radio, videos, etc.), content, cloud, or communication port associated with the application icon 178.

When the warp widget type is the six sided warp widget 170, and upon populating thirty five of the initially available thirty six cells 174 of the warp widget 170, the warp widget 170 generates an additional, or child warp widget 170 with, preferably, six additional sides 172, with each side providing six cells 174. The warp widget 170 further preferably populates the last cell 174 of the last side 172 of the parent warp widget with the newly generated child warp widget 170, and identifies the presence of two warp widgets associated with the parent warp widget 170 by updating the number of warp widgets associated with the parent warp widget, and displaying total number of warp widgets in the WW button 186. This procedure continues for as many application icons 178 the user chooses to place within the warp widget 170. In the preferred embodiment, the user has the option of adding an additional warp widget by tapping the WW button 186.

In a preferred embodiment, whether the warp widget 170 is a six sided warp widget type, or an infinity type warp widget, the user can select, at any time, which type they prefer. The default is a six sided, warp widget type, but may be switched to an infinity type warp widget by pressing the warp widget type indicator 194. Conversely, if the warp widget 170 is in the infinity type warp widget mode, the user may switch it to a six sided warp widget type by pressing the warp widget type indicator 196. In either case, when switching from one warp type to another, the warp widget 170 will align the application icons 178 within the warp widget in accordance with the warp widget type selected and the procedure of icon arrangement for each type described above.

Figure 19:
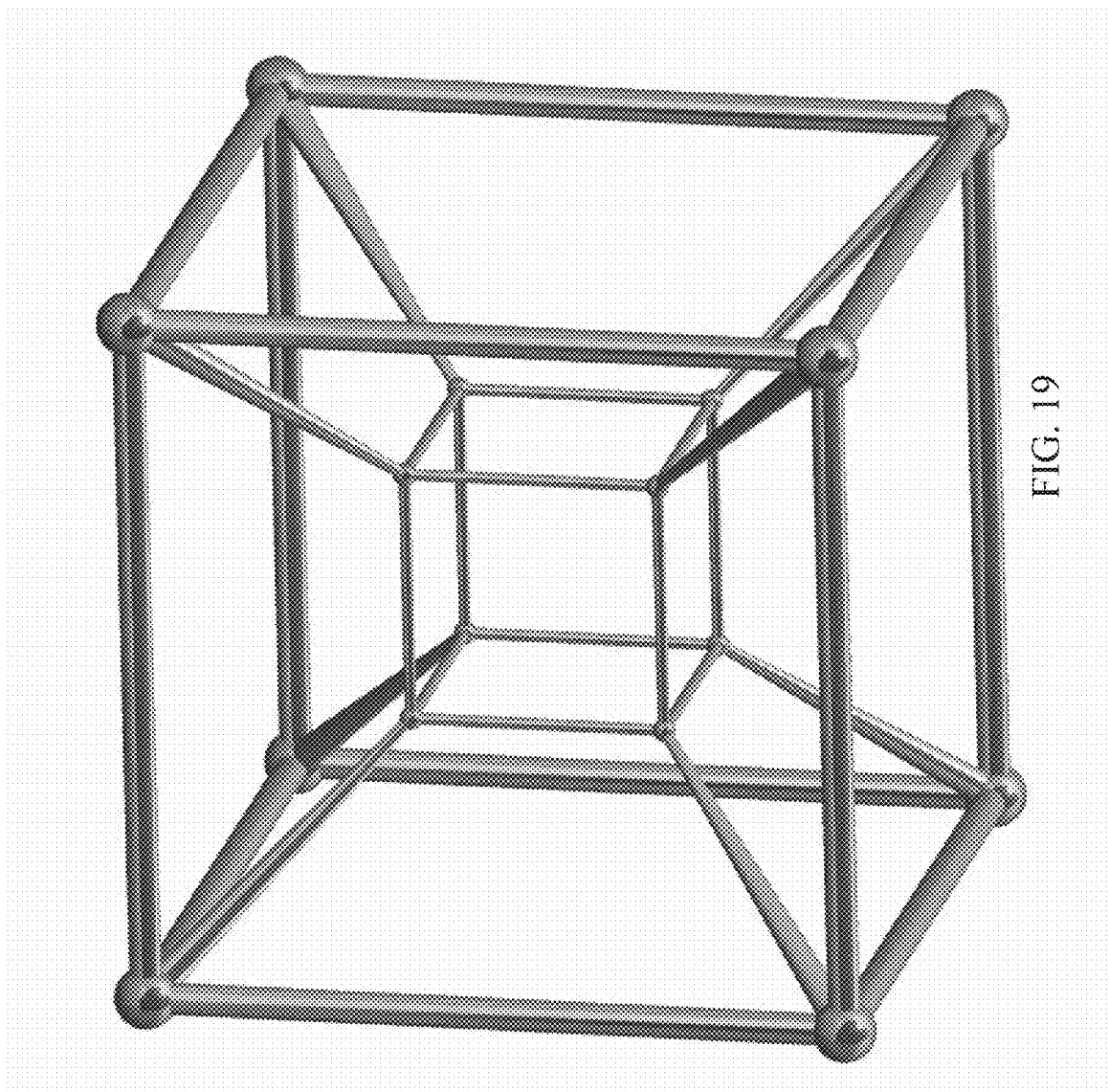
FIG. 19 shows an alternate presentation of a virtual multiple sided virtual rotatable user interface icon queue computer application, wherein the presentation of the application takes the form of a four dimensional figure made up of eight 3-dimensional cubes and depicted in two dimensions.

It is noted that for purposes of describing a preferred embodiment, the applicant has selected an appearance of a six sided, three dimensional, virtual rotatable user interface icon queue computer application. However, the appearance of a six sided, three dimensional, virtual rotatable user interface icon queue computer application does not impose a limitation on the present invention, nor does the appearance of a three dimensional object impose a limitation on the present invention. For example, a tesseract, a four dimensional figure made up of eight 3-dimensional cubes and depicted in two dimensions, as shown by FIG. 19, would be an alternate presentation of the warp widget 170, or a virtual cube having six virtual sides and six axis of rotation (i.e., a vertical axis, a horizontal axis, and four additional axis of rotation, one each through opposing diagonal corners). In any case, and in a preferred embodiment, when activated either the virtual object of FIG. 11, the virtual object of FIG. 18, or the virtual cube, at least three sides are simultaneously presented to a user from which an application icon may be selected and accessed for execution of the application associated with the selected application icon.

FIG. 10 shows a further preferred result of the users interaction with the maintenance button 176, when the warp widget 170 is in the default mode, that is the six sided warp type indicator 196 is highlighted, a pick list 198 of all the warp widgets associated with the parent warp widget 170 (and available for selection) appears on the electronic display screen 110, which warp widget member of the family of warp widgets is being presented for maintenance is disclosed by the warp widget member window 200, and which side of the six sides of the warp member is being shown is indicated by the status window 188. It is further noted that preferably, the warp widget member of the family of warp widgets that is being presented for maintenance is highlighted in the pick list 198, and that the last warp widget member 202 of the family of warp widgets is the $50^{th}$ member of the family, and has not been specifically identified, or named.

In a preferred embodiment, to update the name of any member of the family of warp widgets, the user actively selects the warp widget of interest from the pick list 198, by tapping the selection, or clicking on the selection. Preferably, by actively selecting a specific member of the family of warp widgets, such as that the last warp widget member 202 of the family of warp widgets, the first side of the selected warp widget is displayed on the electronic display screen 110 (not depicted), and a dialog box 204 appears on the electronic display screen 110. Preferably, the text that appears in the dialog box 204 may be edited to reflect what the user desires the selected warp widget to be identified as, for example "50 Enterprise Applications", and upon entering the desired identification, the title shown by the pick list 198 will be updated, unless that desired identification is already in use by an alternate warp widget member. If an identification conflict occurs, the user will be presented with a choice of keeping the desired identification, or selecting an alternate identification for the selected warp widget. Preferably, if the user selects to keep the desired identification, the warp widget 170 will update the title shown in the pick list 198, present the first side of the alternate warp widget with the same identification, and open the dialog box 204 to accept an alternate title for the alternate warp widget with the conflicting identification.

In a preferred embodiment, while the maintenance mode is active, the user may drag any of the application icons 178 from its associated cell 174, and drop the selected application icon 178 on the electronic display screen 110. Preferably, with the application icon 178 on the electronic display screen, the visual information depicted by the selected application icon 178 may be edited to reflect what the user desires the selected application icon 178 to be identified as.

In a preferred embodiment, whether the user elects to alter the visual presentation of the selected application icon 178 presented on the electronic display screen 110, the user has the option of re-inserting the selected application icon 178 into any cell 174, of any side 172, of any member of the family of warp widgets on the system. Preferably, if the user selects, for re-entry of the selected application icon 178 into the family of warp widgets, a cell downstream of the cell 174 from which the application icon 178 was dragged from and dropped on the electronic display screen 110, the warp widget responds by incrementing up one cell the application icon of the selected re-insertion cell, along with each of the application icons between the original cell associated with the application icon 178 that was dragged from and dropped on the electronic display screen 110 and the selected re-insertion cell, to fill the cell associated with the application icon 178 that was dragged from and dropped on the electronic display screen 110.

In a further feature of a preferred embodiment, if the user selects, for re-entry of the selected application icon 178 into the family of warp widgets, a cell upstream of the cell 174 from which the application icon 178 was dragged from and dropped on the electronic display screen 110, the warp widget responds by decrementing down one cell the application icon of the selected re-insertion cell, along with each of the application icons between the original cell associated with the application icon 178 that was dragged from and dropped on the electronic display screen 110, and the selected re-insertion cell up one cell to fill the cell associated with the application icon 178 that was dragged from and dropped on the electronic display screen 110.

In a preferred embodiment with the warp widget 170 in the default mode, the user is aided with navigation of the family of warp widgets by the navigation window 184, which in addition to the warp widget member window 200 that identifies which warp widget of the family of warp widgets is being presented, provides: an increment button 206, which when activated with a single tapper or click, increments the selected warp widget to the next available side, and when activated with a double tap or click, increments to the next available warp widget of the family of warp widgets. The preferred embodiment further provides a decrement button 208, which when activated with a single tap or click, decrements the selected warp widget to the previously available side, and when activated with a double tap or click, decrements to the previously available warp widget of the family of warp widgets. Still further the preferred embodiment provides a downstream availability button 210, which when activated with a single tap or click, advances the selected warp widget to the last available side of the selected warp widget, and when activated with a double tap or click, advances to the next available warp widget of the family of warp widgets. Yet further, the preferred embodiment provides an upstream availability button 212, which when activated with a single tap or click, advances the selected warp widget to the first available side of the selected warp widget, and when activated with a double tap or click, advances to the first previous available warp widget of the family of warp widgets.

Additionally, the warp widget member window 200 of the preferred embodiment permits users to jump to any warp widget of the family of warp widgets by allowing the user to enter the warp widget number associated with the desired warp widget of the warp widget window.

Continuing with FIG. 10, in a preferred embodiment, any icon on the desk top of the electronic display screen 110 may be placed under the control of the warp widget 170 by dragging and dropping the selected icon into an open cell 174, and once under the control of the warp widget 170, when that icon is dragged back to the desk top, that selected icon may be edited as described hereinabove. Further, in a preferred embodiment, when the internet connection condition indicator 192 of the population button 190 is eliminated, the user may access the internet by tapping or clicking on the population button 190.

In a preferred embodiment, when the user accesses the internet through the population button 198 of the warp widget, any purchases, downloads, or links made by the user on the internet will be managed by the warp widget 170. As an example, and not as a limitation, if a user were to select a video game for purchase or lease and grants access by the supplier to the tablet computer 102 and the input device 114, the warp widget 170 automatically handles all the interaction with the supplier of the game and allows the supplier of the game to access the tablet computer 102 and the input device 114. With access to the tablet computer 102 and the input device 114, the supplier pushes the content onto the tablet computer 102 or the input device 114, establishes all required links for access to the game, places an icon associated with the game into an available cell 174 of the warp widget 170, and opens the warp widget of the family of warp widgets that contains the game icon, and highlights the game icon. When the game icon is highlighted, the user has access to the game. After first use of the game, the highlight feature is discontinued.

Preferably, in those instances that the selected game needs to be downloaded onto the tablet computer 102 or input device 114, and there is insufficient storage space, the warp widget 170 will advise the user of the amount of storage space available, the amount of storage space needed, and present a warp widget populated with application icons 178 that if removed from the system would provide the amount of storage space needed by the selected for purchase game, and one cell 174 populated with the message "TERMINATE PURCHASE?". If the user selects, by tapping on or clicking on any of the application icons, that application will be removed from the system and the commercial transaction will continue. If the user selects, by tapping on or clicking on the TERMINATE PURCHASE icon, the commercial transaction will be discontinued.

Figure 15:
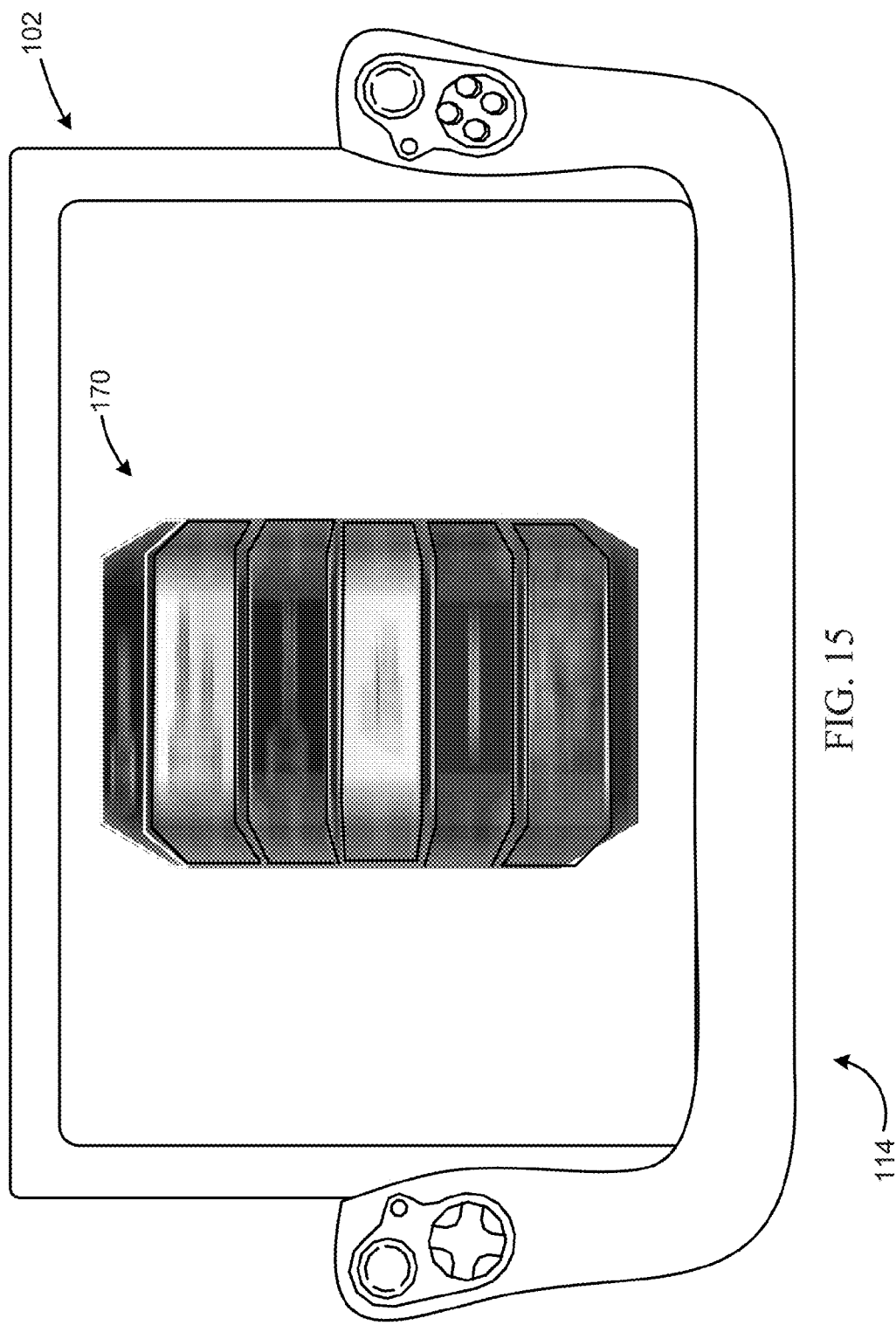
FIG. 15 presents the warp widget of FIG. 14 in virtual rotation.

FIG. 11 demonstrates a front view of a preferred embodiment of the novel virtual rotatable user interface icon queue 170 [warp widget 170] for the electronic display screen 110 or portion thereof showing the warp widget 170 as it appears in the expanded, unpopulated, active mode. The warp widget 170 preferably responds to a user's manual contact scroll across the face of the warp widget 170 by providing an appearance of rotation, and presenting different sides 172, and icon presentation cells 174 to the user. The direction, speed, and duration of the apparent rotation (no actual rotation occurs, it only appears to rotate, i.e., an ornamental rotation of the warp widget 170) is directly proportional to the direction and speed of the users contacting scroll. Each side 172, of the warp widget 170 presents a plurality of fully functional user interface icon cells 174, responsive to activation by a user, when the application icons are presented on the front face, and on either side of the front face. That is, when the warp widget 170 appears as shown by FIG. 12, any of the application icons 178, of any of the three sides 172 of the warp widget 170 depicted on the electronic display screen 110, may be activated to launch the application associated with the activated application icon 174. As shown by FIGS. 11 and 12, when in the active mode, the warp widget 170 provides a navigation window 184, which operates the navigation of the warp widget substantially in the manner as described hereinabove. FIG. 15 depicts a warp widget 170 in rotation.

Preferably, the virtual rotation of the warp widget 170 occurs about an imaginary axis 193, and in a preferred embodiment, activation of the selected application icon 178 is attained by tapping or clicked on the selected application icon 178. However, skilled artisans will understand there are other forms of activating the desired application icon 178, for example, but not limited to, the use of voice commands, audio signal, or other biological input commands, such as eye movement.

FIG. 12 shows that in a preferred embodiment, and not by way of limitation, the warp widget 170 includes a warp widget music icon 214, which when activated launches a warp widget that houses music videos and mp3 recordings. Preferably, the warp widget music icon 214 is configured to facilitate an association of a pick list with the application icons presented in the cells of the faces of the warp widget music icon 214. For example, but not by way of a limitation, if a select icon is an icon dedicated to mp3 recordings of the band Foofighters, selection of the application icon will pull up a pick list of the Foofighters' mp3 recordings available to the user, and through use of the population button of FIG. 10, if the user selects the purchase of an additional mp3 recording of the band Foofighters over the internet, the newly acquired song will be automatically placed in the Foofighters pick list. Preferably, the same scenario holds with the inclusion of a music video warp widget, or a book warp widget, or a photo warp widget, or an internet purchases warp widget, or for that matter any commercial transactions warp widget.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular tablet computer without departing from the spirit and scope of the present invention.

What is claimed is:

1. A device comprising:
 a tablet computer, the tablet computer providing a plurality of sides, each of the plurality of sides are disposed between an electronic display screen of the tablet computer and a back of the tablet computer;
 input device in electronic communication with the tablet computer, the input device providing side structures, the side structures adjacent to and confining the tablet computer on at least two opposing sides of the plurality of sides of the tablet computer, the input device providing a plurality of input switches, wherein said input switches are adjacent each of the at least two opposing sides of the plurality of sides of the tablet computer;
 a warp widget displayed on the electronic display screen communicating with each the input device and the tablet computer, the warp widget responsive to an interaction by a user with the electronic display screen, wherein the warp widget is a virtual multiple sided virtual rotatable user interface icon queue computer application, when said warp widget is in an operating mode;
 a plurality of application icons controlled by the warp widget, and wherein at least more than one side of the plurality of sides presents a plurality of icons, each icon upon selection and activation by a user launches a separate and distinct application associated with the selected icon rather than presenting an attribute associated with the selected application; and
 means for controlling a movement, rotation, and activation of the warp widget on the electronic display screen of the tablet computer.

2. The device of claim 1, in which upon activation of said tablet computer, said warp widget is displayed at a home position on the electronic display when said warp widget is in a retracted, inactive mode, said home position is visually located at a predetermined location of the electronic display, wherein said warp widget visually moves from said home position on the electronic display in response to an activation of the warp widget by the user, and in which the at least more than one side is not less than three sides.

3. The device of claim 2, in which each side of said warp widget presents a plurality of cells, wherein each cell provides a portal that displays a predetermined application icon, the cell further responds to an activation request of the user by activating a computer application associated with the predetermined application icon, when said warp widget is displayed in an expanded, active mode.

4. The device of claim 3, in which the warp widget is a first warp widget, and a predetermined application icon of a cell of the plurality of cells is an application icon associated with a second warp widget, said second warp widget displayed in the home position responds to an activation request of the user for activation of the second warp widget icon.

5. The device of claim 4, in which a predetermined application icon of an alternate cell of the plurality of cells is a video game application icon associated with a video game, the video game fully operative in response to an activation request of the user for activation of the video game application icon.

6. The device of claim 5, in which a predetermined application icon of an alternative cell of the plurality of cells is a television media application icon associated with a television channel game, the television channel fully operative in response to an activation request of the user for activation of the television media application icon.

7. The device of claim 6, in which a predetermined application icon of a selected cell of the plurality of cells is a productivity application icon associated with a productivity application, the productivity application fully operative in response to an activation request of the user for activation of the productivity application icon.

8. The device of claim 3, in which the warp widget provides access to the tablet computer to an application provider upon acceptance by the user of an application offering of the application provider, the application provider installs on the tablet computer an application operational code for the application offering and provides an application icon associated with the application offering to the warp widget, the warp widget displays the provided application icon associated with the application offering in an open cell of the plurality of cells.

9. The device of claim 8, in which the warp widget creates a new side of the plurality of sides when all cells of the plurality of cells associated with the plurality of sides are populated with application icons, the new side of the plurality of sides providing an associated plurality of cells.

10. The device of claim 9, further comprising an application icon displayed on the electronic display, the application icon displayed on the electronic display is associated with and controlled by the warp widget upon a drag and drop of the application icon displayed on the electronic display onto an open cell of the plurality of cells of the warp widget.

11. An apparatus comprising:
a tablet computer, the tablet computer providing a plurality of sides, each of the plurality of sides are disposed between an electronic display screen of the tablet computer and a back of the tablet computer;
a warp widget displayed on the electronic display screen and communicating with the tablet computer, the warp widget is displayed in a contracted, non-active mode else in an expanded, active mode, the warp widget is a virtual multiple sided virtual rotatable user interface icon queue computer application, when said warp widget is displayed in the expanded, active mode in response to an activation of the warp widget by a user, and wherein the warp widget remains displayed in a user selected predetermined location of the display screen whether in the contracted, non-active mode, or the expanded, active mode; and
means for controlling a movement, rotation, and activation of the warp widget on the electronic display screen of the tablet computer.

12. The apparatus of claim 11, in which the electronic display is a touch screen and means for controlling the movement of the warp widget on the electronic display is a touch of a user interacting with the touch screen.

13. The apparatus of claim 12, in which upon activation of said tablet computer, said warp widget is displayed at a home position on the electronic display when said warp widget is in a retracted, inactive mode, said home position is visually located at a predetermined location of the electronic display, and wherein said warp widget visually moves from said home position and displays the expanded, active mode on the electronic display in response to an activation of the warp widget by the user.

14. The apparatus of claim 13, in which the warp widget in the active mode reveals a front face, the front face providing a plurality of fully functional application icons, responsive to activation by a user.

15. The apparatus of claim 14, in which the warp widget, in the expanded, active mode, responds to a user manual contact scroll across the face of the warp widget by providing an appearance of rotation, wherein the direction, speed, and duration of the apparent rotation of the warp widget is directly proportional to the direction and speed of the users contacting scroll.

16. The apparatus of claim 15, in which each side of the warp widget, when rotated to a front face presents a plurality of fully functional application icons, responsive to an activation by a user, when the warp widget appears as non-rotating.

17. The apparatus of claim 11, in which the means for controlling the movement of the warp widget on the electronic display screen is provided by an input device, the input device comprises:
a pair of side structures, one of the pair of side structures is adjacent to and confines the tablet computer on a first side of the plurality of sides of the tablet computer, the second side structure of the pair of side structures is adjacent to and confines the tablet computer on a second side of the plurality of sides of the tablet computer, wherein the first and second sides of the plurality of sides of the tablet computer are opposing sides of the plurality of sides of the tablet computer;
a plurality of input switches, wherein said input switches are adjacent each of the at least two opposing sides of the plurality of sides of the tablet computer; and
a bridge structure disposed between the pair of side structures and adjacent a third side of the plurality of sides of the tablet computer, the bridge structure in combination with the pair of side structures form a three sided structure in which the tablet computer nests such that the tablet computer is confined by the three sided structure, and the three sided structure mitigates inadvertent removal of the tablet computer from the three sided structure when the tablet computer is fully nested within the three sided structure.

18. The apparatus of claim 17, further comprises:
a first input/output connector provided by the tablet computer;
a second input/output connector provided by the input device; and
a communications protocol, the communications protocol provides structured communication between the tablet computer and the input device when the first and second input/output connectors are connected together.

19. The apparatus of claim 18, in which the communications protocol is a universal serial bus, and the first and second input/output connectors are universal serial bus connectors.

20. The apparatus of claim 19, in which a predetermined number of the plurality of switches collaborate with each other to form a command input, the command input controlling movement of the warp widget on the electronic display screen of the tablet computer.

* * * * *